United States Patent
Johansson et al.

(10) Patent No.: US 8,971,263 B2
(45) Date of Patent: Mar. 3, 2015

(54) QOS MANAGEMENT FOR SELF-BACKHAULING IN LTE

(75) Inventors: Niklas Johansson, Sollentuna (SE); Gunnar Mildh, Sollentuna (SE); Andras Racz, Budapest (HU)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 733 days.

(21) Appl. No.: 13/124,946

(22) PCT Filed: Oct. 20, 2008

(86) PCT No.: PCT/SE2008/051174
§ 371 (c)(1),
(2), (4) Date: Apr. 19, 2011

(87) PCT Pub. No.: WO2010/047626
PCT Pub. Date: Apr. 29, 2010

(65) Prior Publication Data
US 2011/0194535 A1    Aug. 11, 2011

(51) Int. Cl.
H04W 28/00 (2009.01)
H04W 76/00 (2009.01)
H04W 28/24 (2009.01)
H04W 72/04 (2009.01)
H04W 76/04 (2009.01)
H04W 88/08 (2009.01)
H04W 92/20 (2009.01)

(52) U.S. Cl.
CPC .......... *H04W 28/24* (2013.01); *H04W 72/0453* (2013.01); *H04W 76/041* (2013.01); *H04W 88/08* (2013.01); *H04W 92/20* (2013.01)
USPC .......................................... 370/329; 370/338

(58) Field of Classification Search
None
See application file for complete search history.

(56) References Cited

U.S. PATENT DOCUMENTS

| 8,139,526 | B2 * | 3/2012 | Zhou et al. ................ | 370/329 |
| 2005/0007994 | A1 | 1/2005 | Fukuzawa et al. | |
| 2006/0203778 | A1 * | 9/2006 | Han et al. .................. | 370/335 |
| 2007/0086388 | A1 | 4/2007 | Kang et al. | |
| 2007/0110005 | A1 * | 5/2007 | Jin et al. ..................... | 370/335 |
| 2008/0040507 | A1 | 2/2008 | Hsu et al. | |

(Continued)

FOREIGN PATENT DOCUMENTS

| EP | 1775984 A2 | 4/2007 |
| JP | 2005012718 A | 1/2005 |

(Continued)

OTHER PUBLICATIONS

3rd Generation Partnership Project, Ericsson, "A Discussion on Some Technology Components fro LTE-Advanced," 3GPP Draft; TSG-RAN WG1 #53, R1-082024, Kansas City, USA, May 5-9, 2008.

(Continued)

*Primary Examiner* — Marcus R Smith
(74) *Attorney, Agent, or Firm* — Coats & Bennett, PLLC

(57) ABSTRACT

A method manages bearers over a first wireless link between a self-backhauled base station and a base station, where the self-backhauled base station serves one or more user equipments (UEs) via one or more second wireless links in a network. The method is implemented at the self-backhauled base station and includes identifying changes in numbers and/or characteristics of UE bearers multiplexed onto a backhaul bearer associated with the first wireless link. The method further includes dynamically reconfiguring resources allocated to the backhaul beare.

25 Claims, 30 Drawing Sheets

(56) References Cited

U.S. PATENT DOCUMENTS

| | | | |
|---|---|---|---|
| 2008/0056172 A1 | 3/2008 | Nakatsugawa | |
| 2008/0062911 A1 | 3/2008 | Choi et al. | |
| 2008/0108326 A1 | 5/2008 | Park et al. | |
| 2008/0165719 A1 | 7/2008 | Visotsky | |
| 2008/0232324 A1 | 9/2008 | Tajima et al. | |
| 2009/0219853 A1* | 9/2009 | Hart et al. | 370/315 |
| 2009/0252088 A1* | 10/2009 | Rao et al. | 370/328 |
| 2009/0252132 A1* | 10/2009 | Song et al. | 370/338 |
| 2010/0002656 A1* | 1/2010 | Ji et al. | 370/336 |
| 2010/0034148 A1 | 2/2010 | Zhang et al. | |
| 2011/0222428 A1* | 9/2011 | Charbit et al. | 370/252 |
| 2012/0163343 A1 | 6/2012 | Ahluwalia | |

FOREIGN PATENT DOCUMENTS

| | | |
|---|---|---|
| JP | 2006311253 A | 11/2006 |
| JP | 2007116696 A | 5/2007 |
| WO | 2007/019672 A1 | 2/2007 |
| WO | 2007074514 A1 | 7/2007 |
| WO | 2008023814 A2 | 2/2008 |
| WO | 2008/106797 A1 | 9/2008 |
| WO | 2008106797 A1 | 9/2008 |
| WO | 2009134178 A1 | 11/2009 |
| WO | 2009139679 A1 | 11/2009 |

OTHER PUBLICATIONS

Hoymann et al., "A Self-Backhauling Solution for LTE-Advanced," Wireless World Research Forum 21st Meeting, Publ. WWRF21-WG4-07, Stockholm, SE, Oct. 13-15, 2008.

Hoymann, C. et al. "A Self-backhauling Solution for LTE-Advanced." Wireless World Research Forum 21st Meeting, Oct. 13-15, 2008.

3rd Generation Partnership Project. "A Discussion on Some Technology Components for LTE-Advanced." TSG-RAN WG1 #53, R1-082024, Kansas City, MO, USA, May 5-9, 2008.

Iannone, L., et al., "MeshDV: A Distance Vector Mobility-tolerant routing protocol for Wireless Mesh Networks", Jun. 21, 2005, pp. 1-8, retrieved on Jun. 30, 2014, retrieved from internet: www.net.t-labs.tu-berlin.de/papers/IF-MeshDV-05.pdf.

3rd Generation Partnership Project, "3rd Generation Partnership Project; Technical Specification Group Services and System Aspects,; General Packet Radio Service (GPRS) enhancements for Evolved Universal Terrestrial Radio Access Network (E-UTRAN) access (Release 8)", Technical Specification, 3GPP TS 23.401 V8.0.0, Dec. 1, 2007, pp. 1-167, 3GPP, France.

3rd Generation Partnership Project, "3rd Generation Partnership Project; Technical Specification Group Services and System Aspects; General Packet Radio Service (GPRS) enhancements for Evolved Universal Terrestrial Radio Access Network (E-UTRAN) access (Release 12)", Technical Specification, 3GPP TS 23.401 V12.4.0, Mar. 1, 2014, pp. 1-302, 3GPP, France.

3rd Generation Partnership Project, "3rd Generation Partnership Project; Technical Specification Group Services and System Aspects; General Packet Radio Service (GPRS) enhancements for Evolved Universal Terrestrial Radio Access Network (E-UTRAN) access (Release 8)", Technical Specification, 3GPP TS 23.401 V8.3.0, Sep. 1, 2008, pp. 1-204, 3GPP, France.

3rd Generation Partnership Project, "3rd Generation Partnership Project; Technical Specification Group Services and System Aspects; General Packet Radio Service (GPRS) enhancements for Evolved Universal Terrestrial Radio Access Network (E-UTRAN) access (Release 8)", Technical Specification, 3GPP TS 23.401 V8.1.0, Mar. 1, 2008, pp. 1-171, 3GPP, France.

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", Technical Specification, 3GPP TS 36.300 V8.4.0, Mar. 1, 2008, pp. 1-126, 3GPP, France.

Shen, G., et al., "Handover Schemes in IEEE802.16j", IEEE 802.16 Presentation Submission Template (REv. 8.3), Session #43 Tel Aviv, Israel, May 8, 2006, pp. 1-14, IEEE.

Crown A, et al, "Scanning tunneling microscopy investigations of ruthenium- and osmium-modified Pt(100) and Pt(110) single crystal substrates", Feb. 6, 2001, Phys. Chem. Chem. Phys., 2001,3; pp. 3290-3296.

* cited by examiner

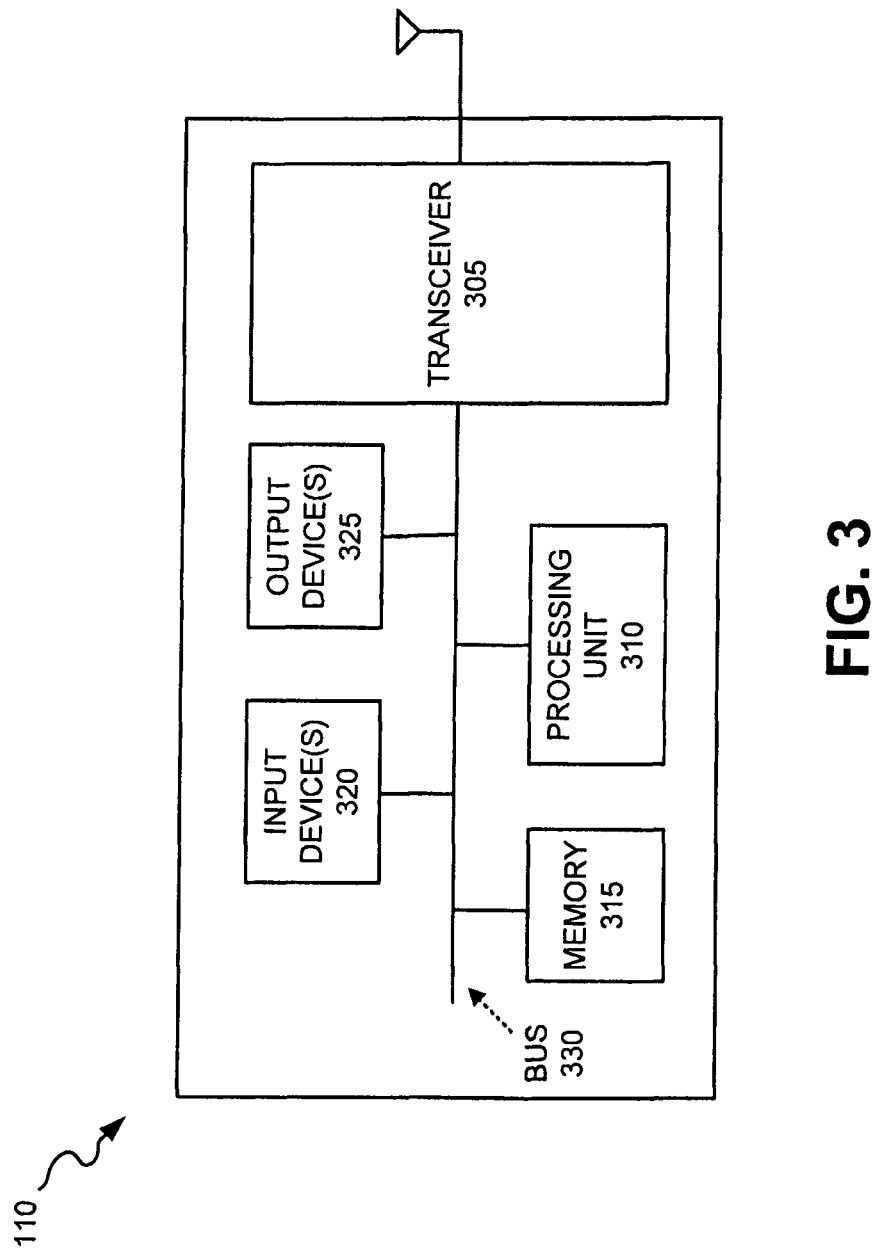

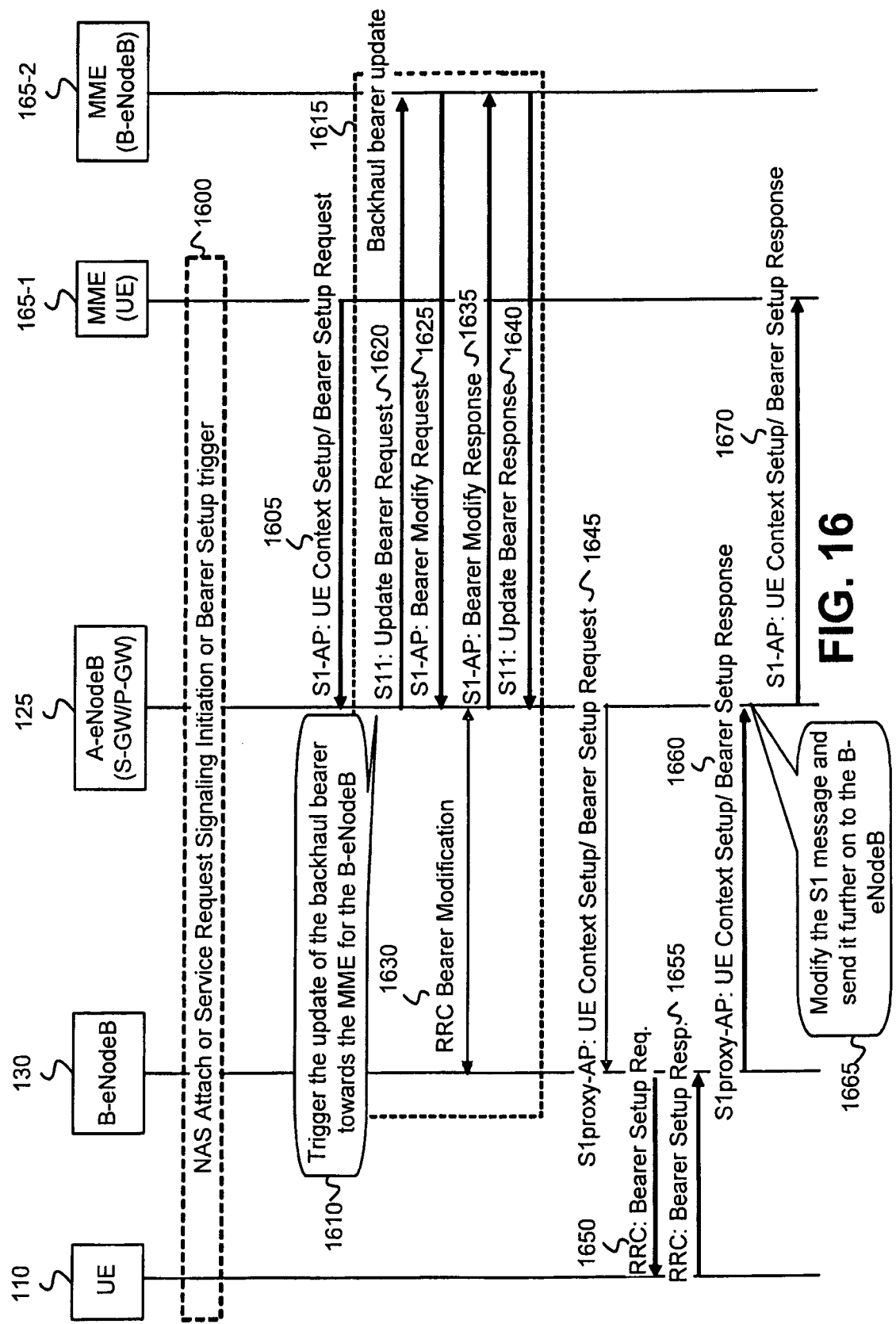

QOS MANAGEMENT FOR SELF-BACKHAULING IN LTE

TECHNICAL FIELD

Implementations described herein relate generally to wireless communication systems and, more particularly, to wireless communication systems employing one or more self-backhauled base stations.

BACKGROUND

The $3^{rd}$ Generation Partnership Project (3GPP) standardization body is currently working on the specification of the evolved 3G mobile system, where the core network related evolution of the architecture is often referred to as SAE (System Architecture Evolution) or Evolved Packet Core (EPC), while the Radio Access Network (RAN) evolution is referred to as Long Term Evolution (LTE) or Evolved Universal Terrestrial Radio Access Network (E-UTRAN). The name SAE/LTE or Evolved Packet System (EPS) refers to the overall system. The Release 8 specification of the 3GPP standard, which is to be completed in 2008, will include the specification of the SAE/LTE evolved system. For an overall description of the LTE part of the architecture, see 3GPP TS 36.300 "E-UTRA, E-UTRAN Overall Description" and for the SAE part, see 3GPP TS 23.401 "General Packet Radio Service (GPRS) Enhancements for E-UTRAN Access."

The SAE/LTE architecture is also often referred to as a two-node architecture, as logically there are only two nodes involved—both in the user and control plane paths—between the User Equipment (UE) and the core network. These two nodes are the base station, called eNodeB in 3GPP terminology and the Serving Gateway (S-GW) in the user plane, and the Mobility Management Entity (MME) in the control plane. There may be multiple S-GW and MME nodes in a network.

The S-GW executes generic packet processing functions similar to router functions, including packet filtering and classification. The MME terminates the Non-Access Stratum (NAS) signaling protocols with the UE and maintains the UE context including the established bearers, the security context, as well as the location of the UE.

In the LTE architecture, the radio link specific protocols, including Radio Link Control (RLC) and Medium Access Control (MAC) protocols, are terminated in the eNodeB. In the control plane, the eNodeB uses the Radio Resource Control (RRC) protocol to execute the longer time scale radio resource control toward the UE, such as, for example, the establishment of radio bearers with certain Quality of Service (QoS) characteristics, the control of UE measurements, or the control of handovers.

The network interface between the eNodeB and the EPC network is called the S1 interface, which has a control plane part (S1-CP) connecting to the MME and a user plane part (S1-UP) connecting to the S-GW. The user plane part of the S1 interface is based on the GPRS Tunneling Protocol (GTP). The tunneling mechanism is needed in order to ensure that the Internet Protocol (IP) packets destined to the UE can be delivered to the correct eNodeB where the UE is currently located. For example, the original IP packet is encapsulated into an outer IP packet that is addressed to the proper eNodeB.

The S1 control plane protocol is called S1-AP and it is carried on top of Stream Control Transmission protocol (SCTP)/IP. The MME uses the S1-AP protocol to talk to the eNodeB, e.g., to request the establishment of radio bearers to support the QoS services for the UE. There is also a network interface between neighbor eNodeBs, which is called the X2 interface, and it has a similar protocol structure as the S1 interface with the exception that the control protocol is called X2-AP. The X2 interface is primarily used for the execution of the handover of a UE from one eNodeB to the other but it is also used for the inter-cell coordination of other Radio Resource Management functions, such as Inter-Cell Interference Coordination. During a handover execution, the source eNodeB communicates with the target eNodeB via the X2-AP protocol to prepare the handover, and during the handover execution it forwards the pending user plane packets to the target eNodeB, which are to be delivered to the UE once it has arrived at the target eNodeB. The packet forwarding is done via the X2 user plane which is using the GTP tunneling protocol similar to the user plane on the S1 interface.

The network infrastructure that is used to connect the different network nodes, e.g., the eNodeBs, MMEs and S-GWs, is an IP based transport network, which can include L2 networks with different technologies, i.e., SDH links, Ethernet links, Digital Subscriber Line (DSL) links or Microwave links, etc. The type of transport network and L2 technologies employed is a deployment issue, depending on the availability, cost, ownership, operator preferences, etc., of such networks in the particular deployment scenario. However, it is generally true that the costs related to the transport network often play a significant part of the overall operation costs of the network.

In a further enhancement of the LTE system, called LTE-Advanced, 3GPP discusses possible solutions to use the LTE radio interface from an eNodeB not only for serving UEs but also for serving as a backhaul link to connect to other eNodeBs. That is, an eNodeB can provide the transport network connectivity for other eNodeBs utilizing a LTE radio connection via the other eNodeBs. This method is called "self-backhauling" since the radio link itself is used also as a transport link for some of the base stations. In an LTE system employing self-backhauling, an eNodeB that is connected to the network via a radio connection is referred to as self-backhauled eNodeB, or B-eNodeB for short, while the eNodeB that is providing the backhaul radio connection for other eNodeB(s) is called the anchor eNodeB, or A-eNodeB for short ("eNodeB," by itself, refers to regular eNodeBs, which are neither self-backhauled nor anchor eNodeBs).

SUMMARY

Currently, there exist no known solutions for realizing self-backhauling in LTE that provide efficient mechanisms for the management of radio resources on the self-backhauled link (e.g., the radio link between the self-backhauled eNodeB and the anchor eNodeB). One shortcoming with existing resource management techniques on the self-backhauled link is that the radio resources allocated to the self-backhauled link are assumed to be static and, therefore, these techniques are unable to follow the dynamic variance of the QoS needs on the self-backhauled link as UE bearers are setup or released. Such a static management of radio resources may lead to either over-provisioning, or QoS violations, and may also result in a non-optimal sharing of radio resources between the radio bearer of the self-backhauled link and the radio bearers of the UEs served by the anchor eNodeB.

Another shortcoming of existing resource management techniques on the self-backhauled link is that the radio bearer used to support the self-backhauled link may look like a normal radio bearer for the anchor eNodeB without any knowledge of the number of UE bearers carried encapsulated in the self-backhauled bearer. This can make it impossible for the anchor eNodeB to handle the self-backhauled bearer differently, such as, for example, giving higher scheduling share or priority that takes into account the number of UE bearers encapsulated within the self-backhauled bearer.

Exemplary embodiments described herein provide solutions for reconfiguring the self-backhauled radio bearer as UE bearers are added and/or removed such as, for example, when UEs enter or leave the cell of the self-backhauled eNodeB (e.g., at handover, at attach, or at idle-active transitions). The exemplary embodiments described herein permit the dynamic reconfiguration of resources allocated to the backhaul bearer as the number and/or the characteristics of individual UE bearer multiplexed onto the given backhaul bearer change due to UE mobility or bearer activation/deactivation. The solutions proposed herein may also make it possible to perform admission control decisions for the backhaul radio bearer in order to check whether it is able to support an incoming UE bearer. The QoS management mechanisms introduced for the backhaul bearer herein enable the radio resources to be utilized more efficiently, such as, for example, avoiding the over-dimensioning of the backhaul link and thereby avoiding the wasting or resources, and also avoiding the congestion of resources which may lead to potential UE bearer QoS violations.

According to one aspect, a method for managing bearers over a first wireless link between a self-backhauled base station and a base station, where the self-backhauled base station serves one or more user equipments (UEs) via one or more second wireless links in a network and where the method is implemented at the self-backhauled base station, may include identifying changes in numbers and/or characteristics of UE bearers multiplexed onto a backhaul bearer associated with the first wireless link. The method may further include dynamically reconfiguring resources allocated to the backhaul bearer based on the determined changes.

According to a further aspect, a method for managing bearers over a first wireless link between a self-backhauled base station and a base station, where the self-backhauled base station serves one or more user equipments (UEs) via one or more second wireless links in a network and where the method is implemented at the base station, may include identifying changes in numbers and/or characteristics of UE bearers multiplexed onto a backhaul bearer associated with the first wireless link. The method may further include dynamically reconfiguring resources allocated to the backhaul bearer based on the determined changes.

According to another aspect, a first base station may be connectable to a second base station via a first wireless link, where the first base station may be capable of providing network service to one or more user equipments (UEs) via one or more second wireless links and via the second base station and the first wireless link. The first base station may include means for determining whether bearers, associated with the one or more UEs, are added to, or removed from, a backhaul bearer associated with the first wireless link. The first base station may further include means for reconfiguring resources allocated to the backhaul bearer based on the determination.

According to an additional aspect, a computer-readable medium may contain instructions executable by at least one processing device. The instructions may include one or more instructions for ascertaining changes in numbers and/or characteristics of bearers multiplexed onto a backhaul bearer associated with a first radio frequency (RF) link between an evolved NodeB (eNodeB) and a self-backhauled eNodeB, where the self-backhauled eNodeB is capable of serving at least one user equipment (UE) via a second RF link. The instructions may further include one or more instructions for reconfiguring resources allocated to the backhaul bearer based on the determined changes.

BRIEF DESCRIPTION OF THE DRAWINGS

FIG. 3 illustrates exemplary components of a UE of FIG. 1;

FIG. 16 is a messaging diagram associated with the exemplary process of FIGS. 15A and 15B;

DETAILED DESCRIPTION

The following detailed description of the invention refers to the accompanying drawings. The same reference numbers in different drawings may identify the same or similar elements. Also, the following detailed description does not limit the invention.

Figure 1:
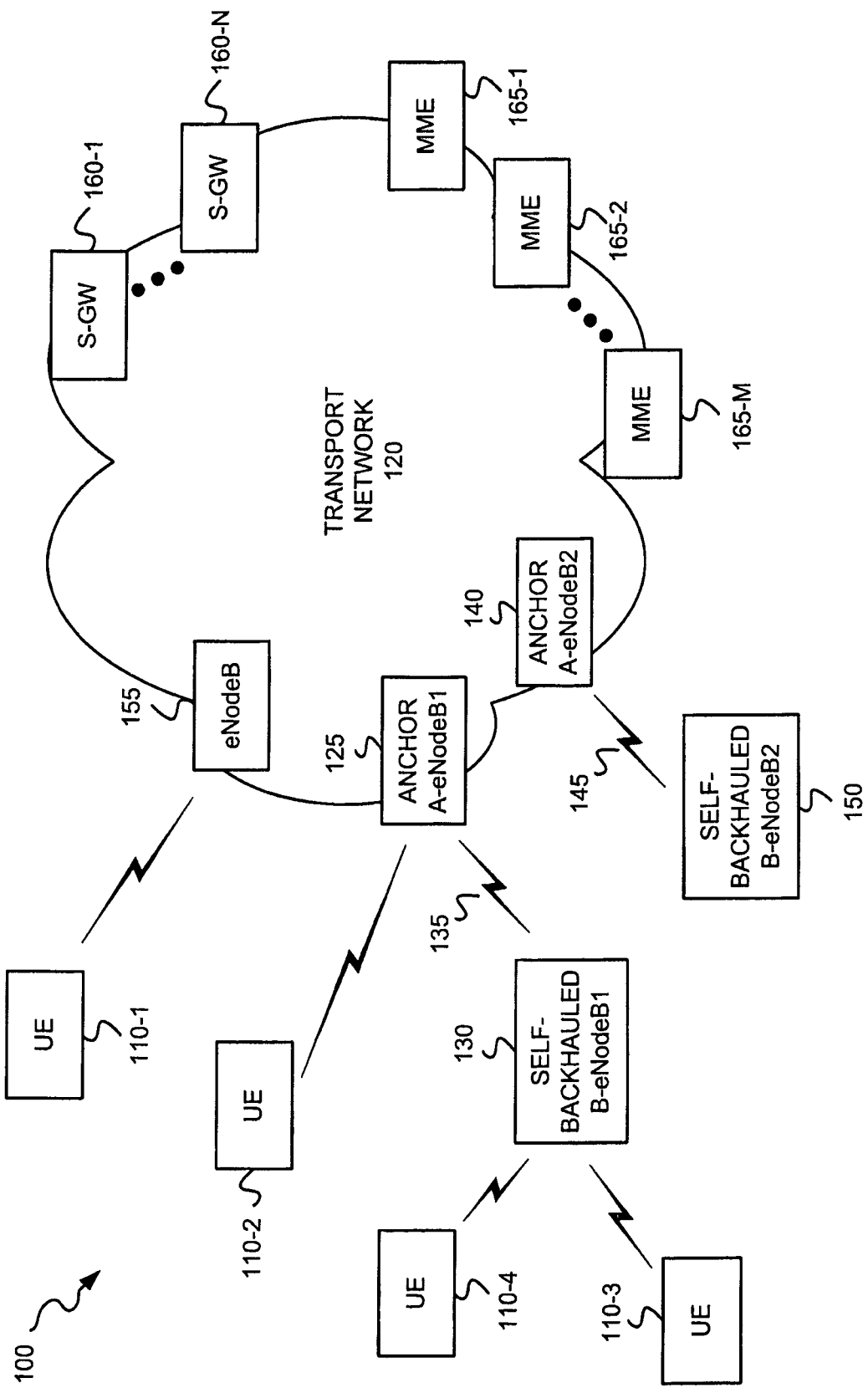
FIG. 1 illustrates an exemplary communications system that includes self-backhauled eNodeBs.

FIG. 1 illustrates an exemplary communications system 100 that may include UE devices 110-1, 110-2, 110-3 and 110-4 connected to an SAE/LTE network, which may include eNodeB nodes, MME nodes, and S-GW nodes, all connected to a transport network 120. As shown in FIG. 1, system 100 may include an anchor eNodeB 125 (A-eNodeB1) that connects to a self-backhauled eNodeB 130 (B-eNodeB1) via a radio interface 135, and an anchor eNodeB 140 (A-eNodeB2) that connects to a self-backhauled eNodeB 150 (B-eNodeB2) via a radio interface 145. Anchor eNodeB 125 and anchor eNodeB 140 may serve UEs in addition to providing a "backhaul" links) to connect to other eNodeBs, such as self-backhauled eNodeB 130 and self-backhauled eNodeB 150. Anchor eNodeB 125 may, thus, use radio interface 135 to provide a transport link for self-backhauled eNodeB 130 and anchor eNodeB 140 may use radio interface 145 to provide a transport link for self-backhauled eNodeB 150. A "self-backhauled eNodeB" as referred to herein includes an eNodeB that is connected to transport network 120 via a radio connection. An "anchor eNodeB" as referred to herein includes an eNodeB that provides a backhaul radio connection for one or more other eNodeBs (e.g., for self-backhauled eNodeBs).

Two anchor eNodeBs and self-backhauled eNodeBs are depicted in FIG. 1 for purposes of simplicity. System 100, however, may include fewer or more anchor eNodeBs and self-backhauled eNodeBs than those shown in FIG. 1. System 100 may further include one or more other eNodeBs (e.g., eNodeB 155 shown in FIG. 1) in addition to anchor eNodeBs 125 and 140, where the other eNodeBs may not provide back-haul links to other eNodeBs. These other eNodeBs (e.g., eNodeB 155) include eNodeBs that are neither anchor eNodeBs nor self-backhauled eNodeBs.

System 100 may additionally include one or more serving gateways (S-GW) 160-1 through 160-N, and one or more mobility management entities (MMEs) 165-1 through 165-M. In some implementations described herein, there may be one S-GW logical function (e.g., S-GW 160-N) associated with a given B-eNodeB and a separate S-GW function (e.g., S-GW 160-1) associated with the UE that is being served by the B-eNodeB. In some implementations, these two logical functions may be co-located in the same physical node. Additionally, S-GWs 160-1 through 160-N may further include Packet Data Network Gateway (P-GW) logical functionality. Alternatively, the P-GW logical functionality may be located in separate physical nodes. S-GWs 160-1 through 160-N may include logical nodes that terminate UE connections (called EPS bearers in 3GPP terminology). The EPS bearer may include the connection provided by the SAE/LTE system in between the UE and the outside network (e.g., the Internet). This connection to the outside network may be provided by the P-GW, which allocates the UE IP address. The EPS bearer may also be the means by which different packet flows can be identified in order to provide them with different quality of service (QoS) treatment. MMEs 165-1 through 165-M may include functionality for handling UE mobility within system 100. For example, MME 165-1 may serve UE 110-3; MME 165-2 may serve B-eNodeB1 130; and MME 165-M may serve B-eNodeB2 150.

UE devices 110-1 through 110-4 may include, for example, a cellular radiotelephone, a personal digital assistant (PDA), a Personal Communications Systems (PCS) terminal, a laptop computer, a palmtop computer, or any other type of device or appliance that includes a communication transceiver that permits UE devices 110 to communicate with other devices via a wireless link. The PCS terminal may, for example, combine a cellular radiotelephone with data processing, facsimile and data communications capabilities. The PDA may include, for example, a radiotelephone, a pager, an Internet/intranet access device, a web browser, an organizer, a calendar, and/or a global positioning system (GPS) receiver. UE devices 110 may be referred to as a "pervasive computing" device.

Transport network 120 may include one or more networks of any type, including a local area network (LAN); a wide area network (WAN); a metropolitan area network (MAN); a satellite network; an intranet, the Internet; or a combination of networks. eNodeBs 125-155, S-GWs 160-1 through 160-N, and MMEs 165-1 through 165-M may reside in an SAE/LTE network and may be connected via transport network 120

Figure 2:
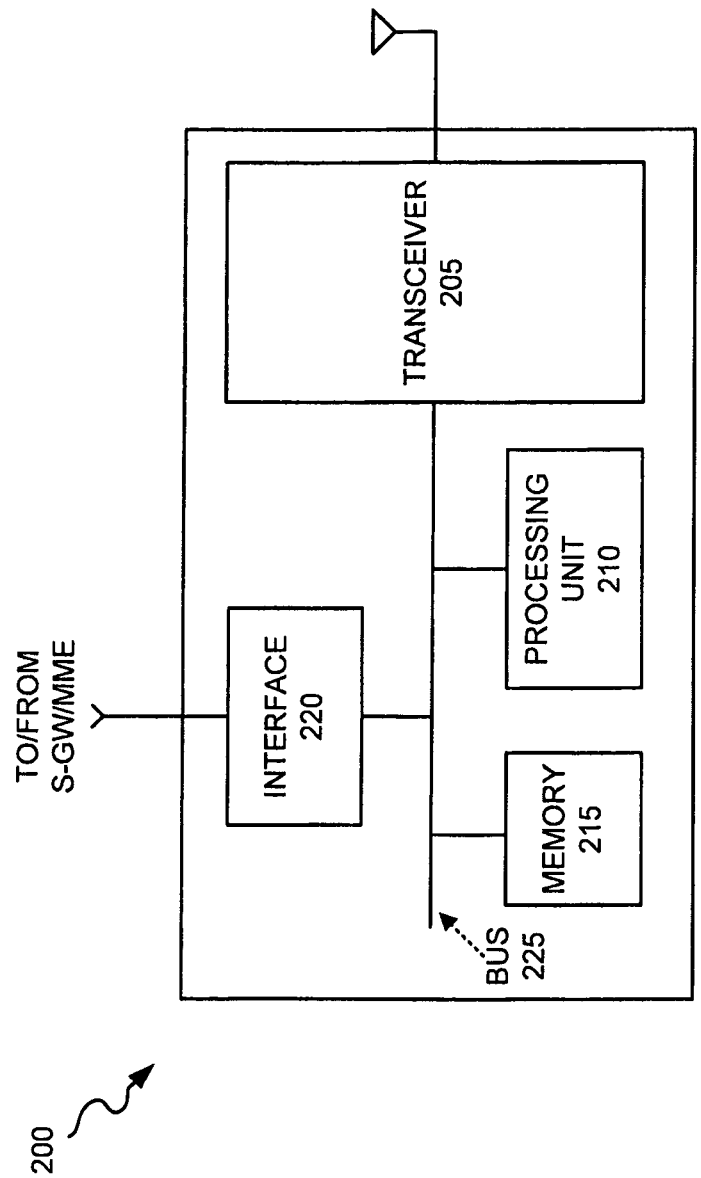
FIG. 2 illustrates exemplary components of a device that may correspond to the anchor eNodeBs and/or self-backhauled eNodeBs of FIG. 1.

FIG. 2 illustrates an exemplary implementation of a device 200 that may correspond to anchor eNodeBs 125 and 140, self-backhauled eNodeBs 130 and 150, and eNodeB 155. Device 200 may include a transceiver 205, a processing unit 210, a memory 215, an interface 220 and a bus 225. Device 200 may omit a wired interface 220 when device 200 corresponds to self-backhauled eNodeBs 130 or 150 (though device 200 may still have a logical interface to a MME 165 and/or a S-GW 160).

Transceiver 205 may include transceiver circuitry for transmitting and/or receiving symbol sequences using radio frequency signals via one or more antennas. Processing unit 210 may include a processor, microprocessor, or processing logic that may interpret and execute instructions. Processing unit 210 may perform all device data processing functions. Memory 215 may provide permanent, semi-permanent, or temporary working storage of data and instructions for use by processing unit 210 in performing device processing functions. Memory 215 may include read only memory (ROM), random access memory (RAM), large-capacity storage devices, such as a magnetic and/or optical recording medium and its corresponding drive, and/or other types of memory devices. Interface 220 may include circuitry for interfacing with a link that connects to transport network 120. Bus 225 may interconnect the various components of device 200 to permit the components to communicate with one another.

The configuration of components of device 200 illustrated in FIG. 2 is for illustrative purposes only. Other configurations with more, fewer, or a different arrangement of components may be implemented.

FIG. 3 illustrates exemplary components of UE 110. UE 110 may include a transceiver 305, a processing unit 310, a memory 315, an input device(s) 320, an output device(s) 325, and a bus 330.

Transceiver 305 may include transceiver circuitry for transmitting and/or receiving symbol sequences using radio frequency signals via one or more antennas. Processing unit 310 may include a processor, microprocessor, or processing logic that may interpret and execute instructions. Processing unit 310 may perform all data processing functions for inputting, outputting, and processing of data including data buffering and device control functions, such as call processing control, user interface control, or the like.

Memory 315 may provide permanent, semi-permanent, or temporary working storage of data and instructions for use by processing unit 310 in performing device processing functions. Memory 315 may include ROM, RAM, large-capacity storage devices, such as a magnetic and/or optical recording medium and its corresponding drive, and/or other types of memory devices. Input device(s) 320 may include mechanisms for entry of data into UE 110. For example, input device(s) 320 may include a key pad (not shown), a microphone (not shown) or a display unit (not shown). The key pad may permit manual user entry of data into UE 110. The microphone may include mechanisms for converting auditory input into electrical signals. The display unit may include a screen display that may provide a user interface (e.g., a graphical user interface) that can be used by a user for selecting device functions. The screen display of the display unit may include any type of visual display, such as, for example, a liquid crystal display (LCD), a plasma screen display, a light-emitting diode (LED) display, a cathode ray tube (CRT) display, an organic light-emitting diode (OLED) display, etc.

Output device(s) 325 may include mechanisms for outputting data in audio, video and/or hard copy format. For example, output device(s) 325 may include a speaker (not shown) that includes mechanisms for converting electrical signals into auditory output. Output device(s) 325 may further include a display unit that displays output data to the user. For example, the display unit may provide a graphical user interface that displays output data to the user. Bus 330 may interconnect the various components of UE 110 to permit the components to communicate with one another.

The configuration of components of UE 110 illustrated in FIG. 3 is for illustrative purposes only. Other configurations with more, fewer, or a different arrangement of components may be implemented.

Figure 4A:
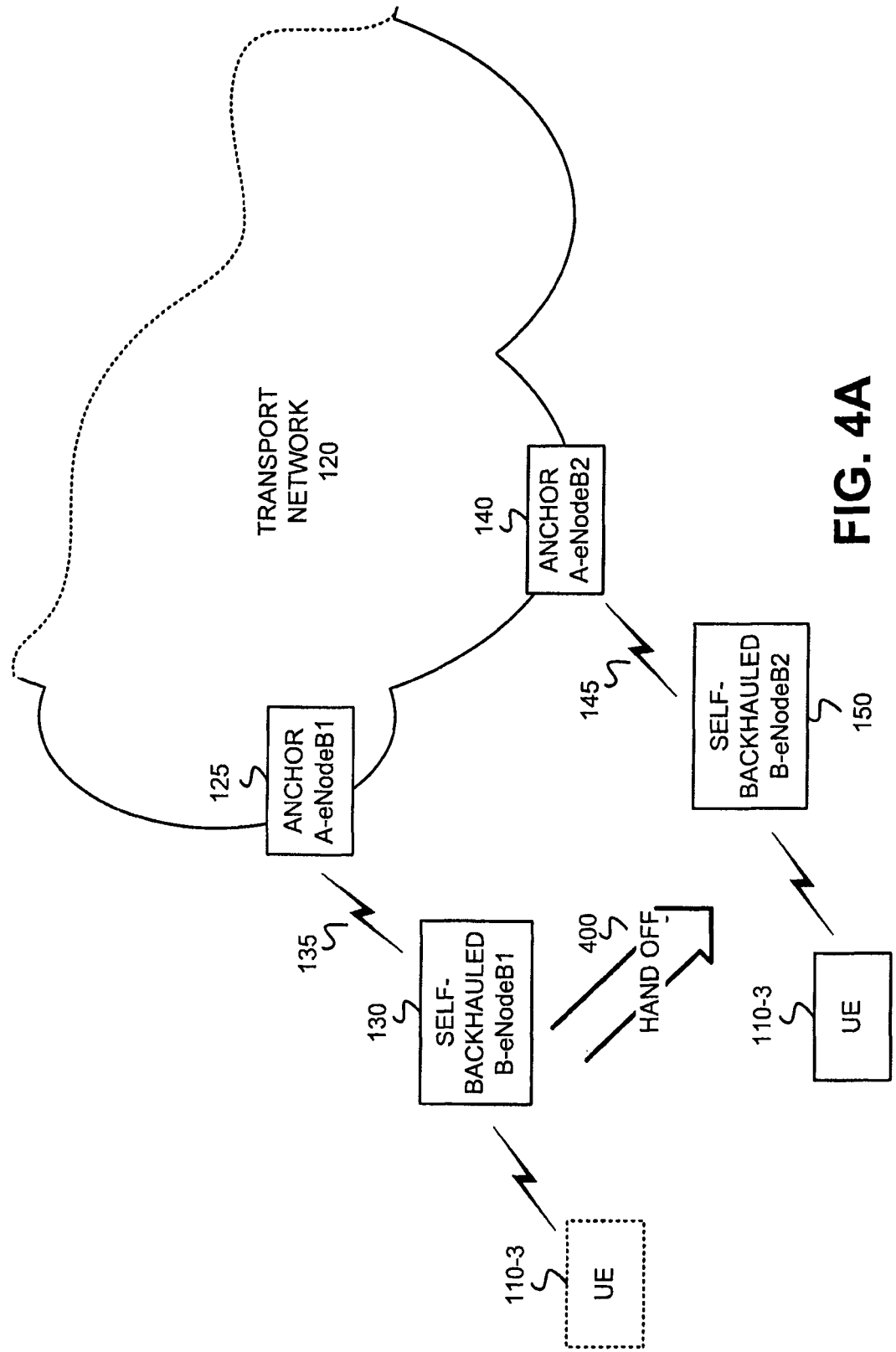
FIGS. 4A and 4B depict an exemplary handoff of a UE from a first self-backhauled eNodeB to a second self-backhauled eNodeB in a wireless communications system.
Figure 4B:
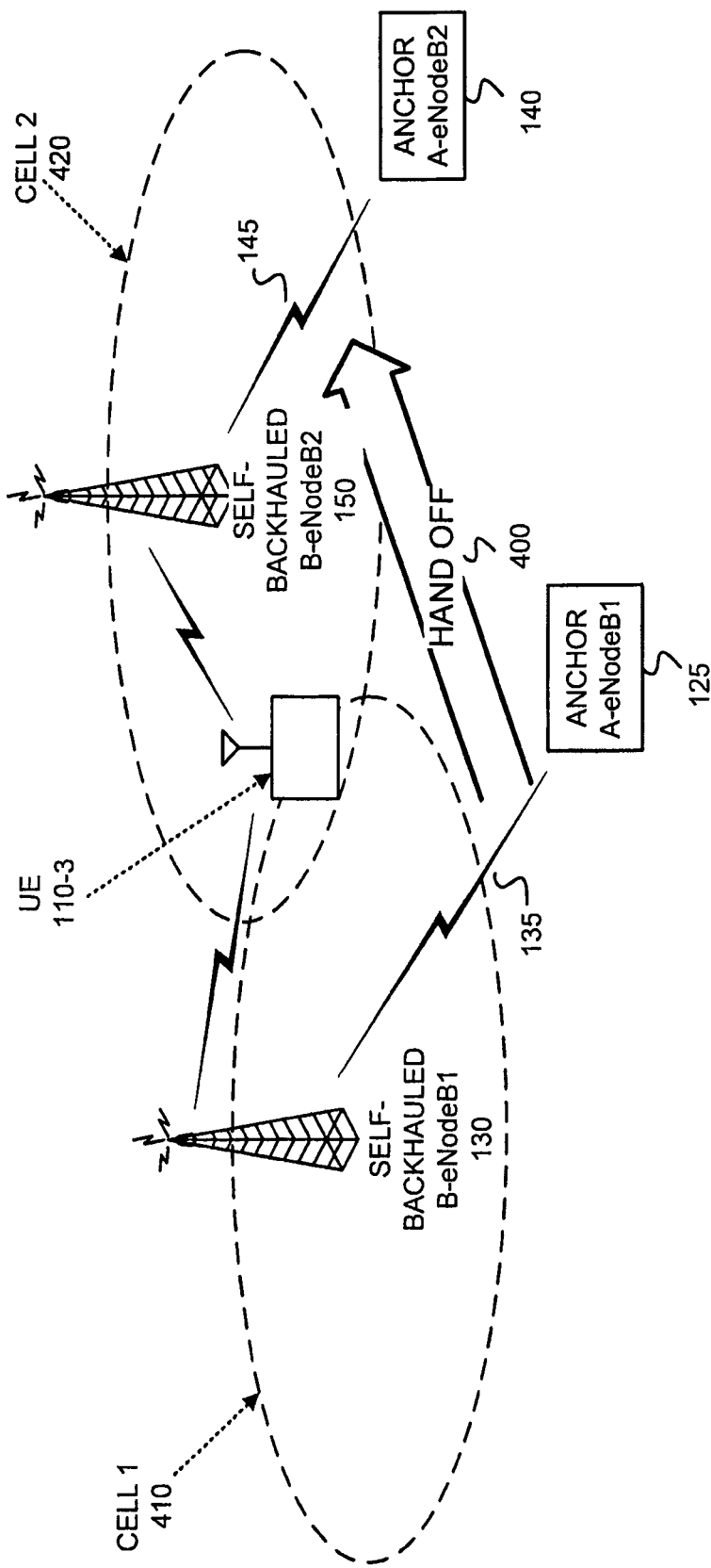

FIGS. 4A and 4B depict an example of UE mobility where UE 110-3 may be handed off from self-backhauled eNodeB 130 to self-backhauled eNodeB 150. As shown in FIGS. 4A and 4B, UE 110-3 initially may reside in cell 1 410 that is served by self-backhauled eNodeB 130 via radio interface 135 and anchor eNodeB 125. However, upon entry of UE 110-3 into cell 2 420 that is served by self-backhauled eNodeB 150 via radio interface 145 and anchor eNodeB 140, UE 110-3 may be handed off 400 to self-backhauled eNodeB 150. As shown in FIG. 4A, self-backhauled eNodeB 150 may connect to transport network 120 via radio interface 145 and anchor eNodeB 140. Subsequent to hand off 400, self-backhauled eNodeB 150 may serve UE 110-3 via radio interface 145 and anchor eNodeB 140 while UE 110-3 is located in cell 2 420.

Figure 5A:
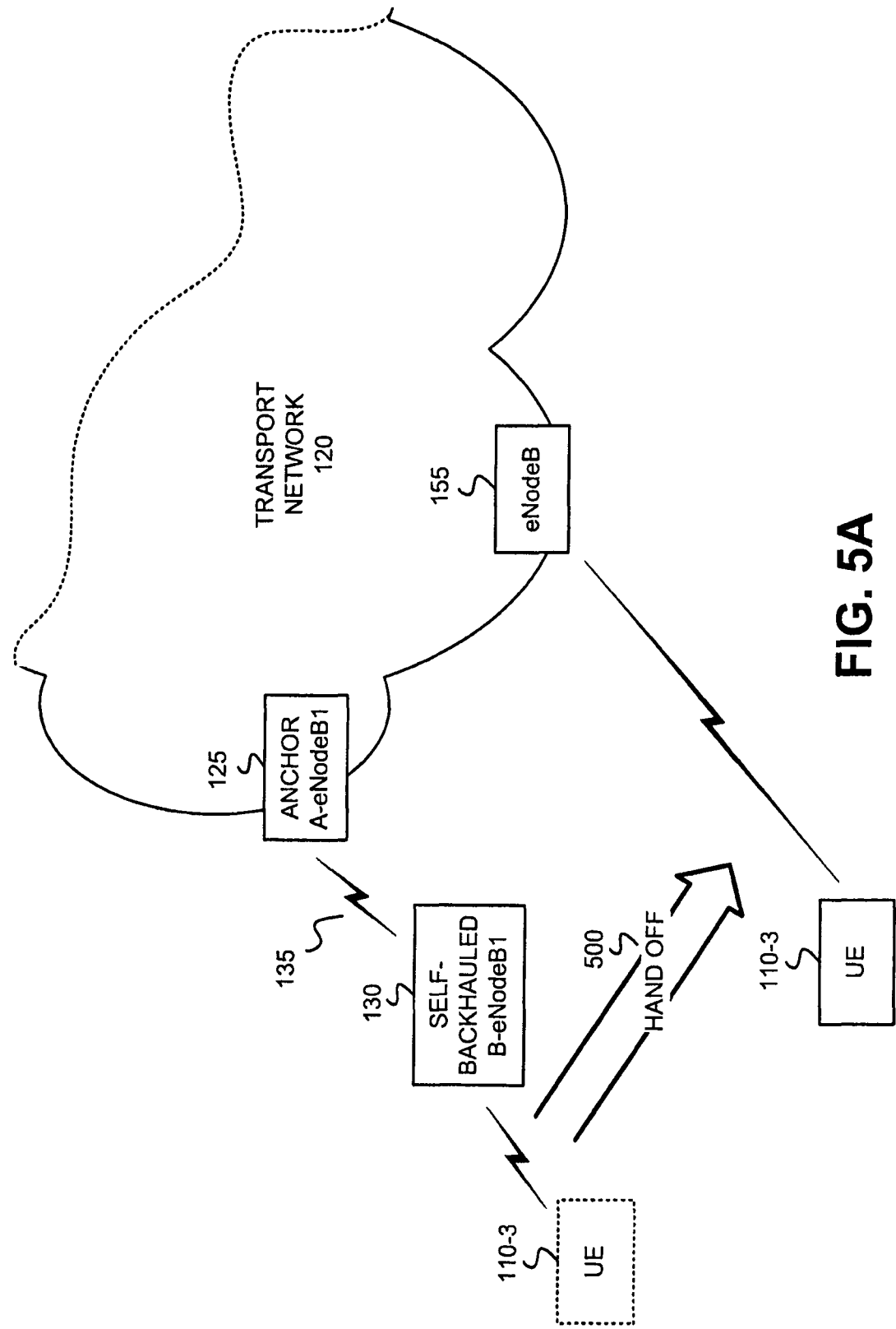
FIGS. 5A and 5B depict an exemplary handoff of a UE from a self-backhauled eNodeB to an eNodeB in a wireless communications system.
Figure 5B:
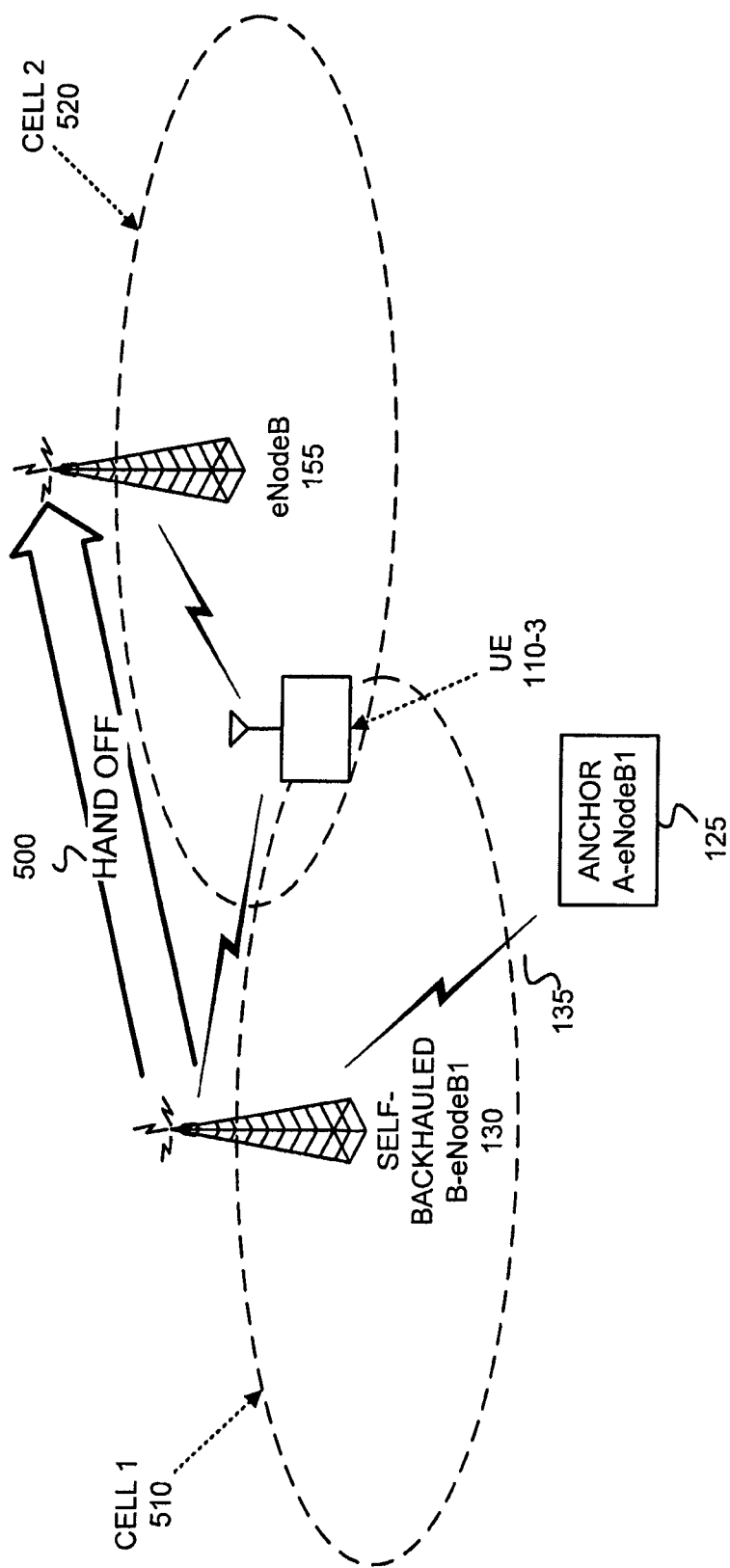

FIGS. 5A and 5B depict an example of UE mobility where UE 110-3 may be handed off from self-backhauled eNodeB 130 to an eNodeB that is not a self-backhauled eNodeB (e.g., eNodeB 155). As shown in FIGS. 5A and 5B, UE 110-3 initially may reside in cell 1 510 that is served by self-backhauled eNodeB 130 via radio interface 135 and anchor eNodeB 125. However, upon entry of UE 110-3 into cell 2 520 that is served by eNodeB 155, UE 110-3 may be handed off 500 to eNodeB 155. As shown in FIG. 5A, eNodeB 155 may connect to transport network 120. Subsequent to hand off 500, eNodeB 155 may serve UE 110-3 while UE 110-3 is located in cell 2 520.

Figure 6:
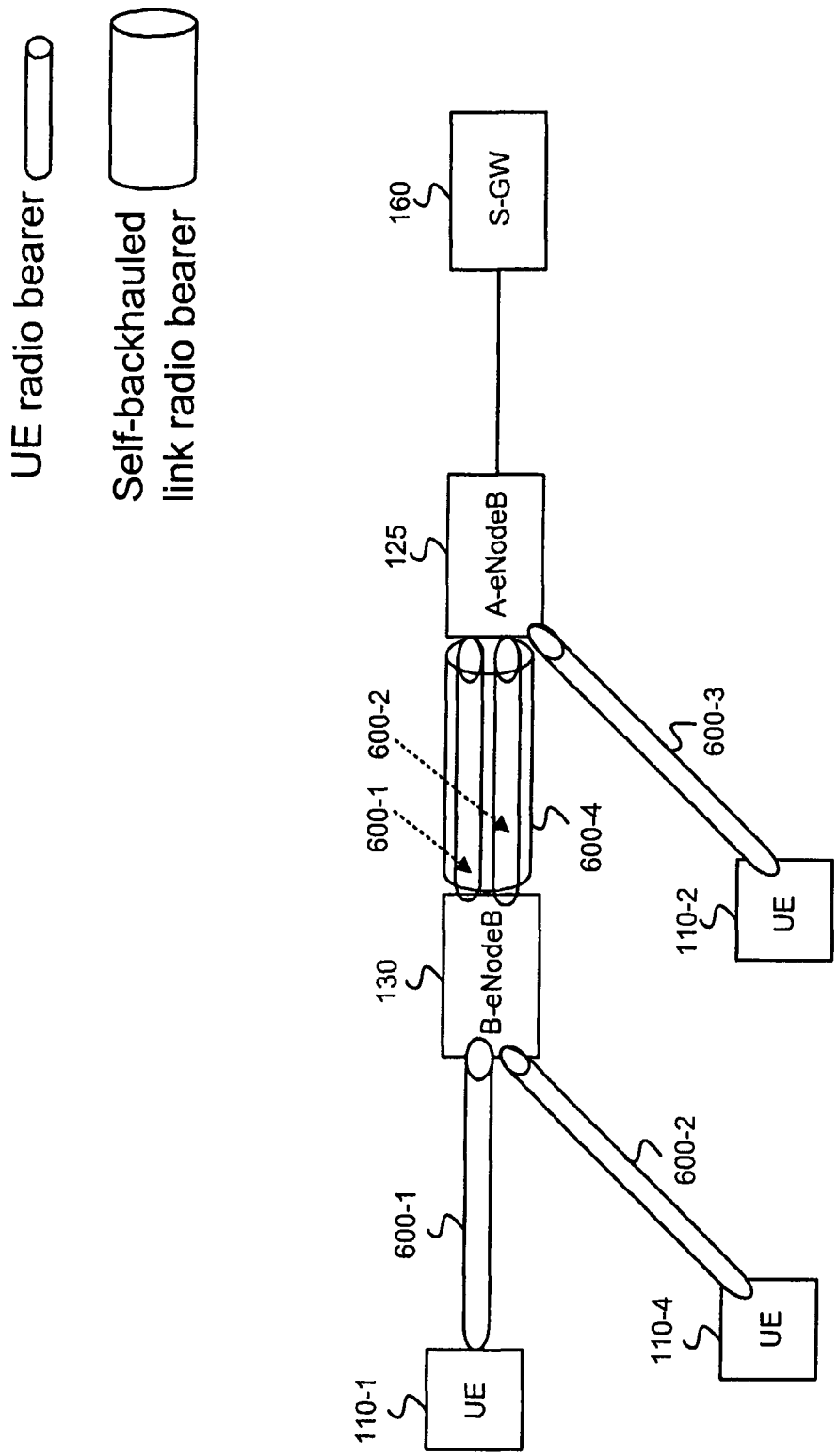
FIG. 6 illustrates the relationship between individual UE bearers and a radio bearer of a self-backhauled link according to an exemplary embodiment.

FIG. 6 depicts the relationship between individual UE bearers and the radio bearer of the self-backhauled link according to an exemplary embodiment. As can be seen in FIG. 6, UE 110-1 may communicate with B-eNodeB 130 via UE radio bearer 600-1, UE 110-4 may communicate with B-eNodeB 130 via UE radio bearer 600-2, and UE 110-2 may communicate with A-eNodeB 125 via UE radio bearer 600-3. As further shown in FIG. 6, UE radio bearers 600-1 and 600-2 may be carried encapsulated in self-backhauled radio bearer 600-4. Since UE radio bearers 600-1 and 600-2 may be carried encapsulated in self-backhauled radio bearer 600-4, these radio bearers appear hidden to A-eNodeB 125. A-eNodeB 125 typically may not receive a notification when a new UE bearer is added to self-backhauled radio bearer 600-4, which may preclude the possibility of updating the self-backhaul link bearer according to changing QoS needs as UEs enter and/or leave the cell of B-eNodeB 130.

In accordance with exemplary embodiments described herein, radio resources allocated for the self-backhauled link may be checked and updated when a UE is added or removed from the backhaul link multiplex. This ensures that the backhaul link has the necessary resources assigned in order to guarantee the QoS needs of the individual UE bearers. Additionally, it is important that the resources for the backhaul link are not over-allocated since this would leave less available resources for radio bearers of regular UEs served by A-eNodeB 125. The radio bearer of the self-backhauled link typically shares the same pool of radio resources with the radio bearers of regular UEs served by A-eNodeB 125 (i.e., assuming in-band self-backhauling with no separate frequency band for the back haul links). For example, in the case of Guaranteed Bit Rate (GBR) UE bearers, which are assumed to be mapped into a GBR backhaul bearer, the reserved bit rate of the GBR backhaul bearer may need to be increased or decreased as UE bearers are added or removed, respectively. Exemplary embodiments described herein trigger an update of the backhaul bearer in various ways that are further described below.

Figure 7A:
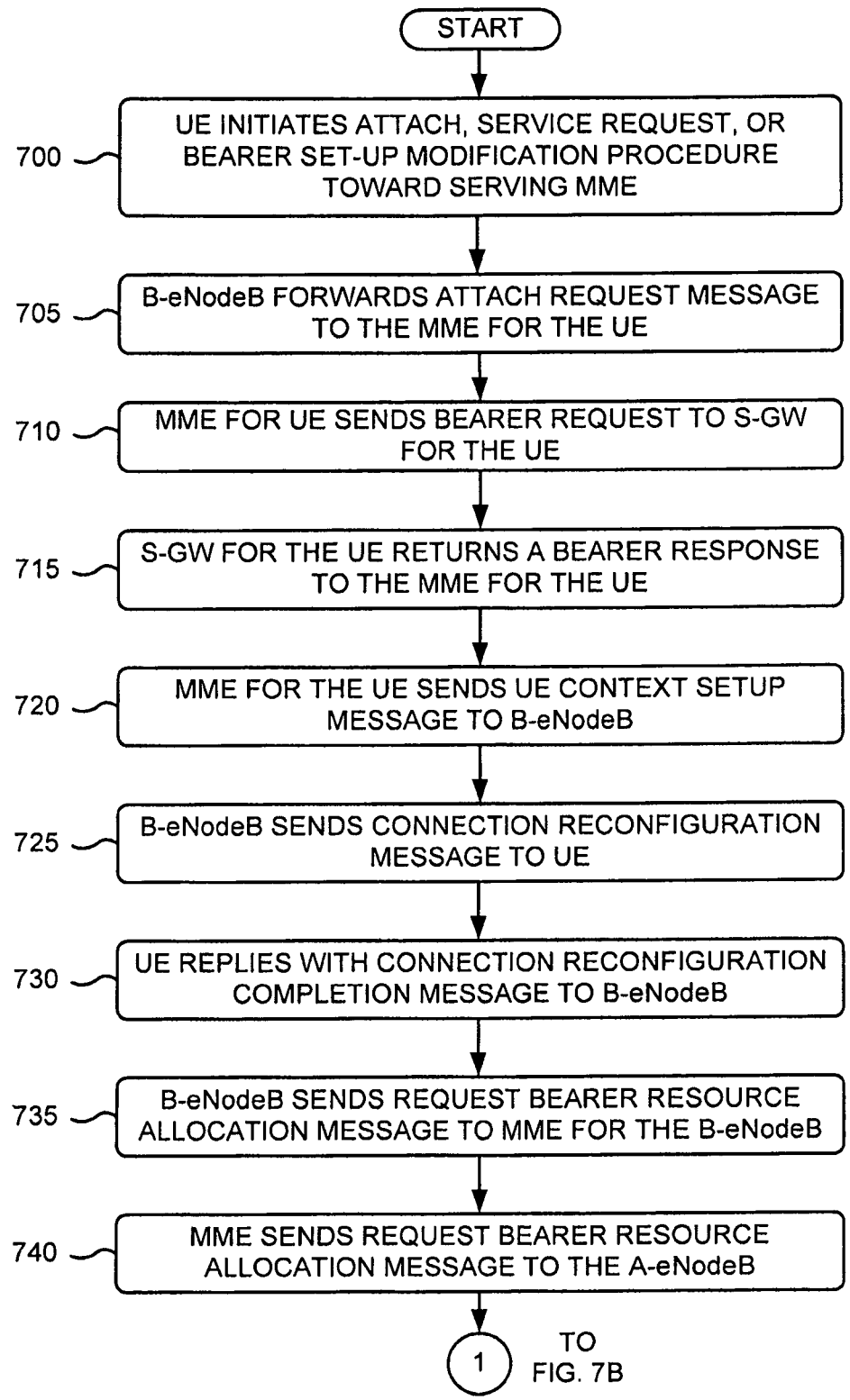
FIGS. 7A and 7B are flowcharts of an exemplary process for triggering a self-backhauled bearer update using a "UE requested bearer resource allocation" procedure.
Figure 7B:
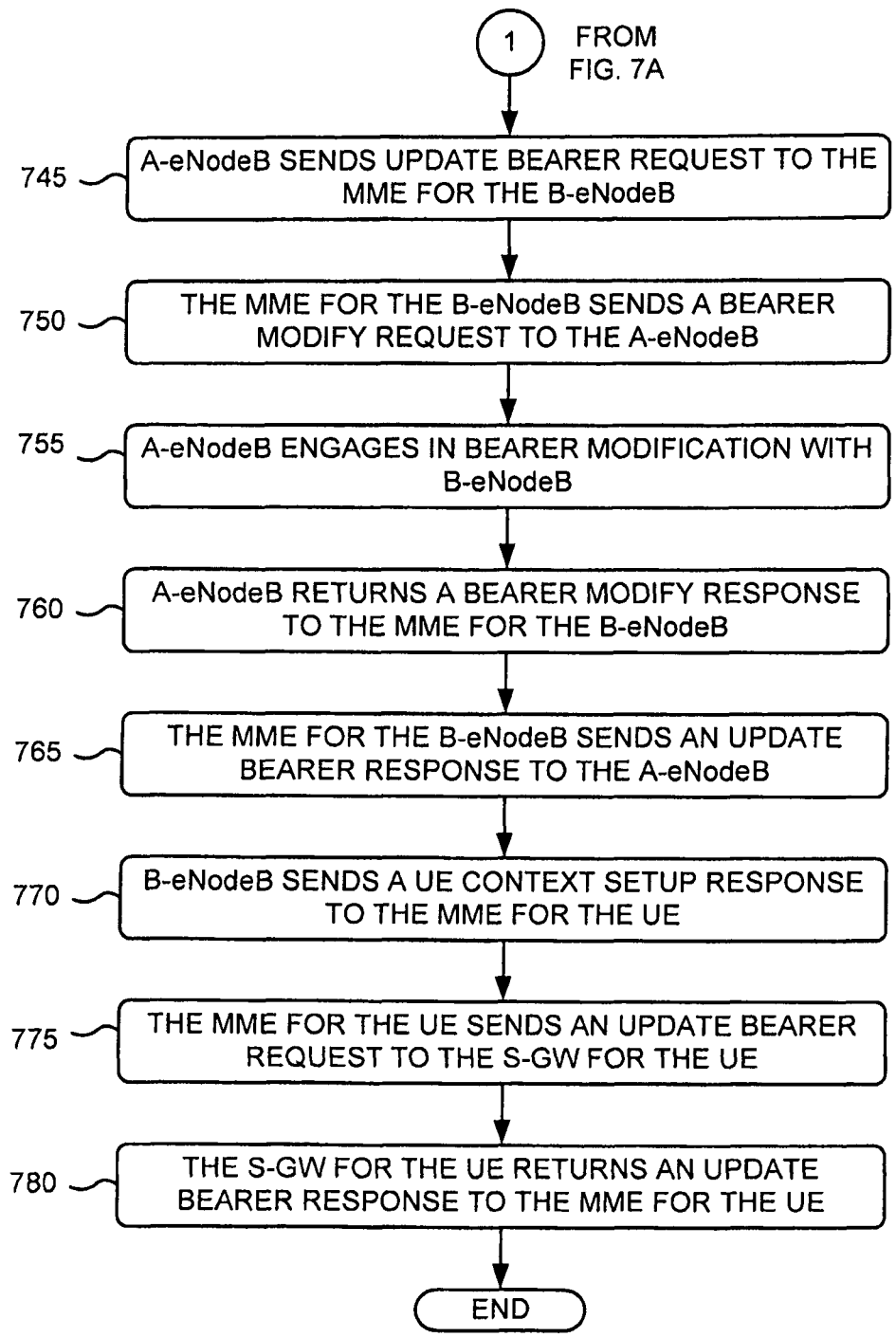

FIGS. 7A and 7B are flowcharts of an exemplary process for triggering a self-backhauled bearer update according to a first exemplary embodiment. In the exemplary process of FIGS. 7A and 7B, a UE requested bearer resource allocation procedure may be used to trigger an update of the self-backhauled link from B-eNodeB 130 towards the MME serving B-eNodeB 130. In the exemplary process of FIGS. 7A and 7B, B-eNodeB 130 may act as a UE when initiating bearer modification. The following description of the exemplary process of FIGS. 7A and 7B is described with reference to the exemplary messaging diagram of FIG. 8 for purposes of illustration. In the messaging diagram of FIG. 8, the triggering of the self-backhauled bearer update is depicted as occurring as a result of a UE attaching to the network via the self-backhauled eNodeB or when the UE performs a service request. The exemplary process of FIGS. 7A and 7B, however, may be applied to cases when a new bearer for a UE served by the B-eNodeB is setup or released, or when a UE enters or leaves the cell of the B-eNodeB at a handover. The handover case is described further below with respect to FIGS. 9 and 10. In the example depicted in FIG. 8, it is assumed that the S-GW/P-GW functionality for the B-eNodeB may be integrated into the A-eNodeB. The exemplary process of FIGS. 7A and 7B may apply also, though, to a case where the S-GW/P-GW functionality may be located in a separate node.

Figure 8:
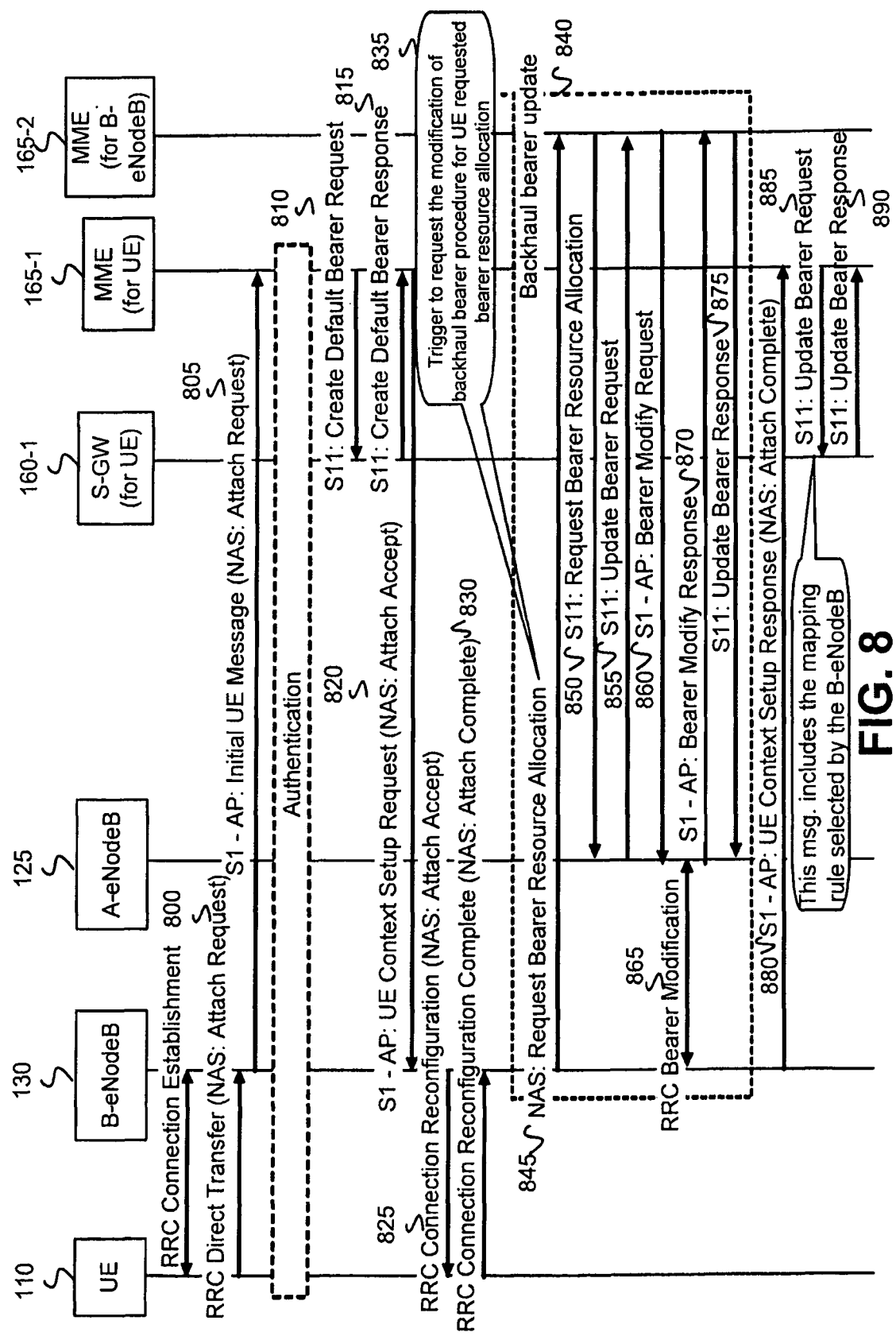
FIG. 8 is a messaging diagram associated with the exemplary process of FIGS. 7A and 7B.

Referring to FIG. 7A, the exemplary process may begin with the UE initiating an attach request, a service request or a bearer set-up modification procedure towards its serving MME (block 700). For example, FIG. 8 depicts an attach request 800 being sent from UE 110 to the MME for the UE (MME 165-1) via B-eNodeB 130. Though not shown in FIG. 8, in the case of a network-initiated UE bearer setup, the trigger may arrive at the MME for the UE from the S-GW/P-GW of the UE. Subsequent to receiving the attach request, the B-eNodeB may forward the attach request message to the MME for the UE (block 705). For example, as shown in FIG. 8, B-eNodeB 130 may forward, based on receipt of attach request 800 from UE 110, an attach request message 805 to MME 165-1.

The MME for the UE may send a bearer request to the S-GW for the UE (block 710) and the S-GW for the UE may return a bearer response to the MME for the UE (block 715). For example, FIG. 8 depicts MME 165-1 sending a create default bearer request message 810 to S-GW 160-1 and S-GW 160-1 returning a create default bearer response message 815 to MME 165-1.

The MME for the UE may send a UE context setup message to the B-eNodeB (block 720). FIG. 8 depicts MME 165-1 returning a UE context setup request message 820 to B-eNodeB 130 notifying B-eNodeB 130 of acceptance of the attach request. The B-eNodeB may send a connection reconfiguration message to the UE (block 725) and the UE may reply with a connection reconfiguration completion message to the B-eNodeB (block 730). For example, as shown in FIG. 8, B-eNodeB 130 may send a connection reconfiguration message 825 to UE 110 and, in response, UE 110 may return a connection reconfiguration complete message 830 to B-eNodeB 130.

B-eNodeB 130 may select a backhaul bearer that the UE bearer should be mapped to and then may trigger 835 and update 840 of the corresponding backhaul bearer by invoking a UE requested bearer resource allocation message 845, as shown in FIG. 8. Thus, to start the backhauler bearer update, the B-eNodeB may send a request bearer resource allocation message to the MME for the B-eNodeB (block 735). The request bearer resource allocation message may include the QoS modifications requested by the B-eNodeB. For example, FIG. 8 depicts B-eNodeB 130 sending request bearer resource allocation message 845 to MME 165-2.

The MME may send a request bearer resource allocation message to the A-eNodeB (block 740), the A-eNodeB may send an update bearer request to the MME for the B-eNodeB (block 745) and the MME for the B-eNodeB may send a bearer modify request to the A-eNodeB (block 750). For example, FIG. 8 depicts MME 165-2 sending a request bearer resource allocation message 850 to A-eNodeB 125, A-eNodeB 125 sending an update bearer request message 855 to MME 165-2, and MME 165-2 returning a bearer modify request message 860 to A-eNodeB 125.

The A-eNode B may engage in bearer modification with the B-eNodeB (block 755). For example, FIG. 8 depicts A-eNodeB 125 engaging in bearer modification 865 with B-eNodeB 130. Subsequent to bearer modification, the A-eNodeB may return a bearer modify response to the MME for the B-eNodeB (block 760) and the MME for the B-eNodeB may send an update bearer response to the A-eNodeB (block 765). For example, FIG. 8 depicts A-eNodeB 125 sending a bearer modify response message 870 to MME 165-2 and MME 165-2 returning an update bearer response message 875 to complete the backhaul bearer update. Subsequent to completion of the backhaul bearer update, the B-eNodeB may respond to the previously received UE context setup request (or Bearer setup/modify request) back to the MME by sending a UE context setup response message 880 to the MME for the UE (block 770). The UE context setup response message 880 may reference the self-backhauled bearer on which the given UE bearer has to be mapped to. This reference may include, for example, the Internet Protocol (IP) address of the B-eNodeB which corresponds to the given backhaul bearer of the B-eNodeB or a corresponding Diffserv codepoint that the S-GW (e.g., S-GW 160-1 in FIG. 8) may use.

The MME for the UE may send an update bearer request to the S-GW for the UE (block 775) and the S-GW for the UE may return an update bearer response to the MME for the UE (block 780). FIG. 8 depicts MME 165-1 sending an update bearer request message 885 to S-GW 160-1, that may include a mapping rule selected by the B-eNodeB, and S-GW 160-1 returning an update bearer response message 890 to MME 165-1.

Figure 9:
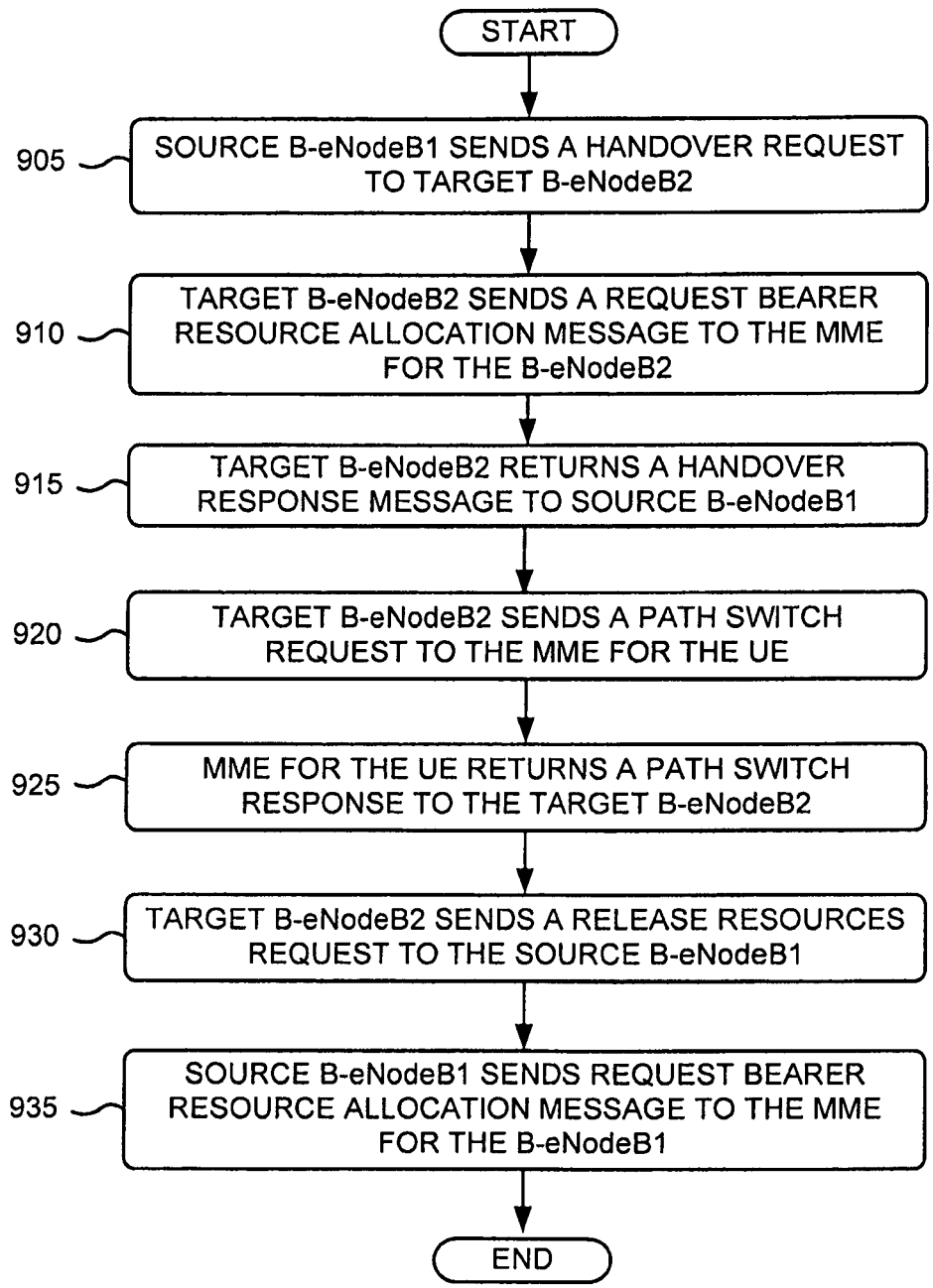
FIG. 9 is a flowchart of an exemplary process for triggering a self-backhauled bearer update based on the UE being handed off from one cell to another cell.

FIG. 9 is a flowchart of an exemplary process for triggering a self-backhauled bearer update based on the UE being handed off from one cell to another cell. In the exemplary process of FIG. 9, a UE requested bearer resource allocation procedure may be used to trigger an update of the self-backhauled link from B-eNodeB 130 towards the MME serving B-eNodeB 130 when a handover occurs. The following description of the exemplary process of FIG. 9 is described with reference to the exemplary messaging diagram of FIG. 10 for purposes of illustration.

Figure 10:
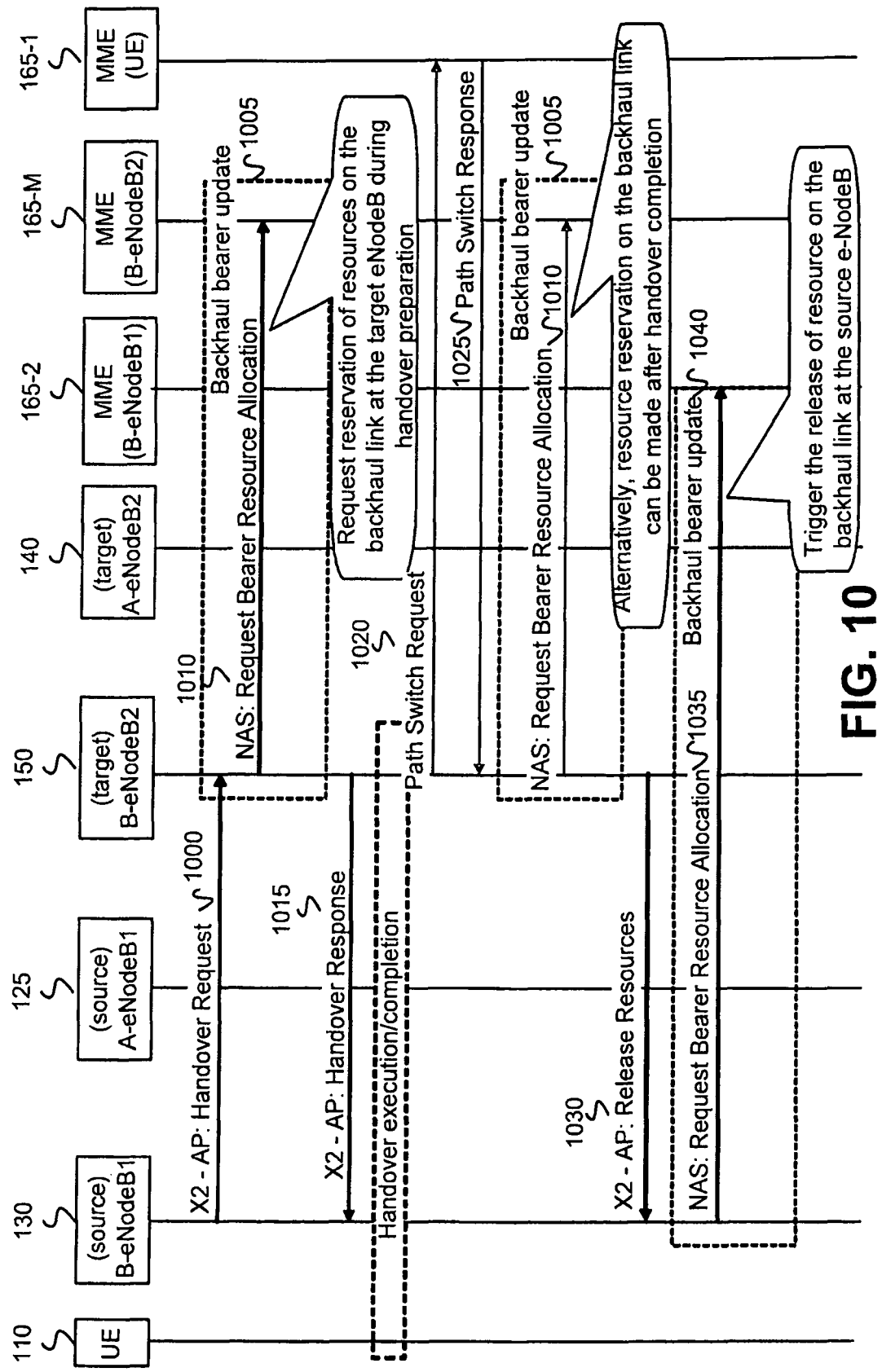
FIG. 10 is a messaging diagram associated with the exemplary process of FIG. 9.

The exemplary process may begin with the source B-eNodeB1 sending a handover request to the target B-eNodeB2 (block 905) and the target B-eNodeB2 sending a request bearer resource allocation message to the MME for the B-eNodeB2 (block 910). For example, FIG. 10 depicts B-eNodeB1 130 sending a handover request 1000, via the X2-AP interface, to B-eNodeB2 150 via A-eNodeB1, and B-eNodeB2 150 initiating a backhaul bearer update 1005 by sending a request bearer resource allocation message 1010 to MME 165-M. Request bearer resource allocation message 1010 may request the reservation of resources on the backhaul link at the target B-eNodeB during handover preparation. Additional messaging, not shown in FIG. 10, may occur during backhaul bearer update 1005 similar to the messaging described above with respect to backhaul bearer update 840 of FIG. 8.

Subsequent to the backhaul bearer update, the target B-eNodeB2 may return a handover response message to the source B-eNodeB1 (block 915). For example, FIG. 10 depicts B-eNodeB2 150 sending a handover response message 1015 to B-eNodeB1 130 via the X2-AP interface.

Handover may be completed with the target B-eNodeB2 sending a path switch request to the MME for the UE (block 920) and the MME for the UE returning a path switch response to the target B-eNodeB2 (block 925). For example, FIG. 10 depicts B-eNodeB2 150 sending a path switch request 1020 to MME 165-1, and MME 165-1 returning a path switch response 1025 to B-eNodeB2 150. In some implementations, backhaul bearer update 1005 may occur after handover completion (e.g., after path switch request 1020 and path switch response 1025 and when the UE has arrived in the target cell), as depicted as an alternative in FIG. 10, to avoid delaying the handover preparation.

When handover is complete, the target B-eNodeB2 may send a release resources request to the source B-eNodeB1 (block 930). The release resources request 1030 may trigger the source B-eNodeB1 130 to initiate the release of resources on the source backhaul link by invoking a backhaul bearer update 1040 that involves messaging similar to the messaging described above with respect to backhaul bearer update 840 of FIG. 8. In response to receipt of the release resources request 1030, the source B-eNodeB1 may send a request bearer resource allocation message to the MME for the B-eNodeB1 (block 935). For example, FIG. 10 depicts B-eNodeB1 130 sending a request bearer resource allocation message 1035 to MME 165-2 to trigger the release of resources on the backhaul link at the source B-eNodeB1.

Additional exemplary embodiments described herein use S1 and/or X2 signaling to notify the anchor eNodeB about the addition or removal of UE bearers to/from the backhaul link. In one exemplary embodiment, multi-hop S1/X2 signaling may be used to notify the anchor eNodeB about the addition or removal of UE bearers to/from the backhaul link. This exemplary embodiment is described with below respect to FIGS. 11-14. In another exemplary embodiment, "proxy" S1/X2 signaling, as further described below with respect to FIGS. 15A-18, may be used to notify the anchor eNodeB about the addition or removal of UE bearers to/from the backhaul link. In a further exemplary embodiment, direct/sequential S1/X2 signaling, as further described below with respect to FIGS. 19-22, may be used to notify the anchor eNodeB about the addition or removal of UE bearers to/from the backhaul link.

Figure 11:
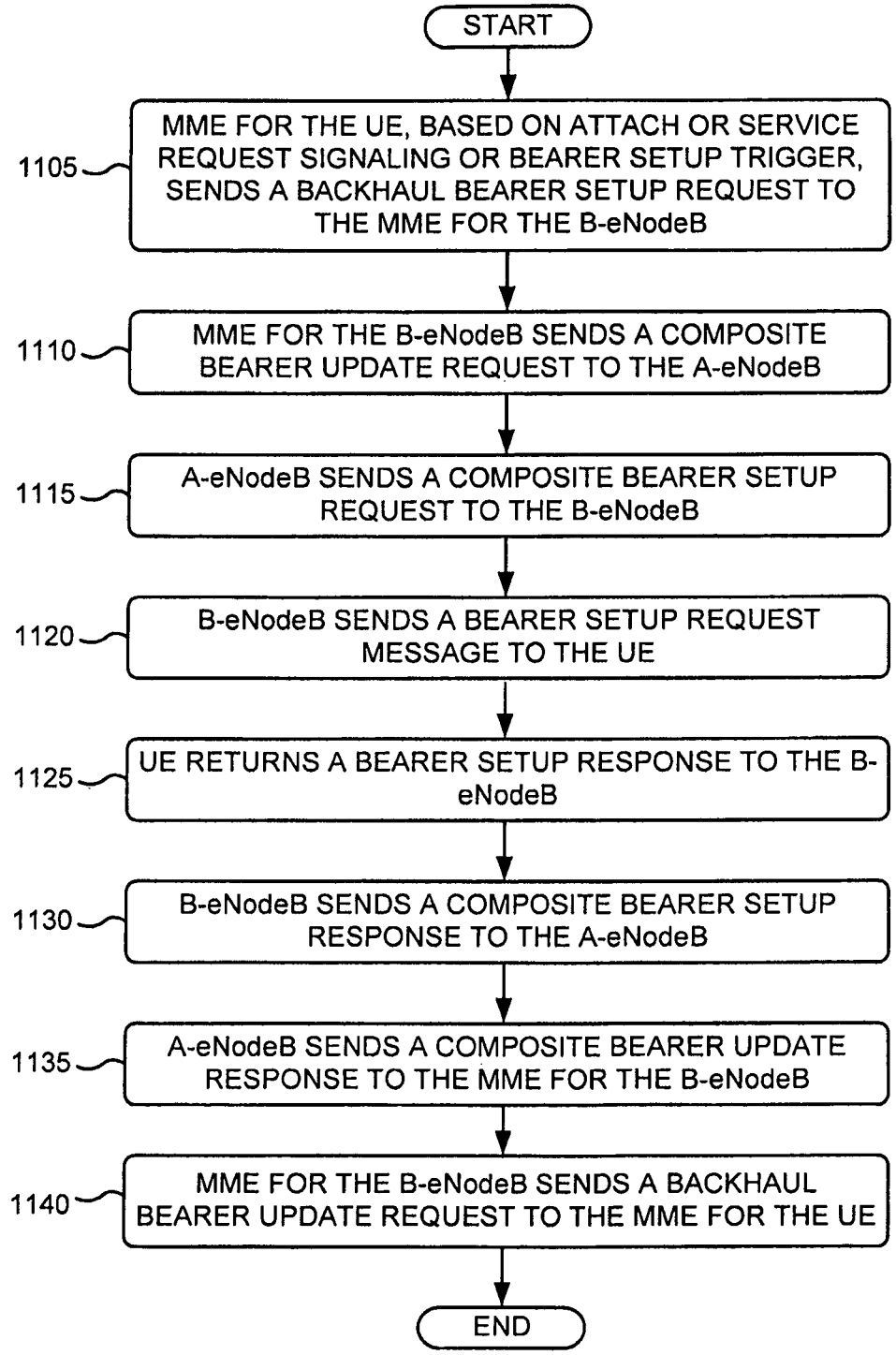
FIG. 11 is a flowchart of an exemplary process for notifying, using multi-hop S1 signaling, an anchor eNodeB of the addition or removal of UE bearers from a backhaul link served by its self-backhauled eNodeB.

FIG. 11 is a flowchart of an exemplary process for notifying an anchor eNodeB of the addition or removal of UE bearers from a backhaul link served by its self-backhauled eNodeB. The exemplary process of FIG. 11 involves an integrated procedure for updating the backhaul bearer and the UE bearers where, when a MME serving a given UE wants to request the setup of a UE bearer at the B-eNodeB, it turns to the B-eNodeB directly (i.e., via the MME of the B-eNodeB and the A-eNodeB). In the exemplary process of FIG. 11, new S1 messages may be introduced for multi-hop S1 signaling, where S1-AP messaging between the MME serving the UE and the B-eNodeB may be sent encapsulated within single hop signaling messages. Complete message encapsulation, however, may represent only one alternative and other alternatives may be used such as, for example, adding additional fields to existing S1 messages. In the exemplary process of FIG. 11, S1-AP signaling intended for the B-eNodeB may be carried encapsulated in the backhaul bearer update procedure and in a multi-hop fashion via the MME of the B-eNodeB and via the A-eNodeB. During this multi-stage processing, the backhaul radio bearer can also be updated at the A-eNodeB and the entire procedure can be rejected at any stage either due to the failure of modifying the backhaul bearer or due to the failure of setting up the UE bearer. The A-eNodeB may perform admission control and make the resource reservation for the backhaul bearer, while similar actions may be taken by the B-eNodeB for the UE bearer. The following description of the exemplary process of FIG. 11 is described with reference to the exemplary messaging diagram of FIG. 12 for purposes of illustration.

Figure 12:
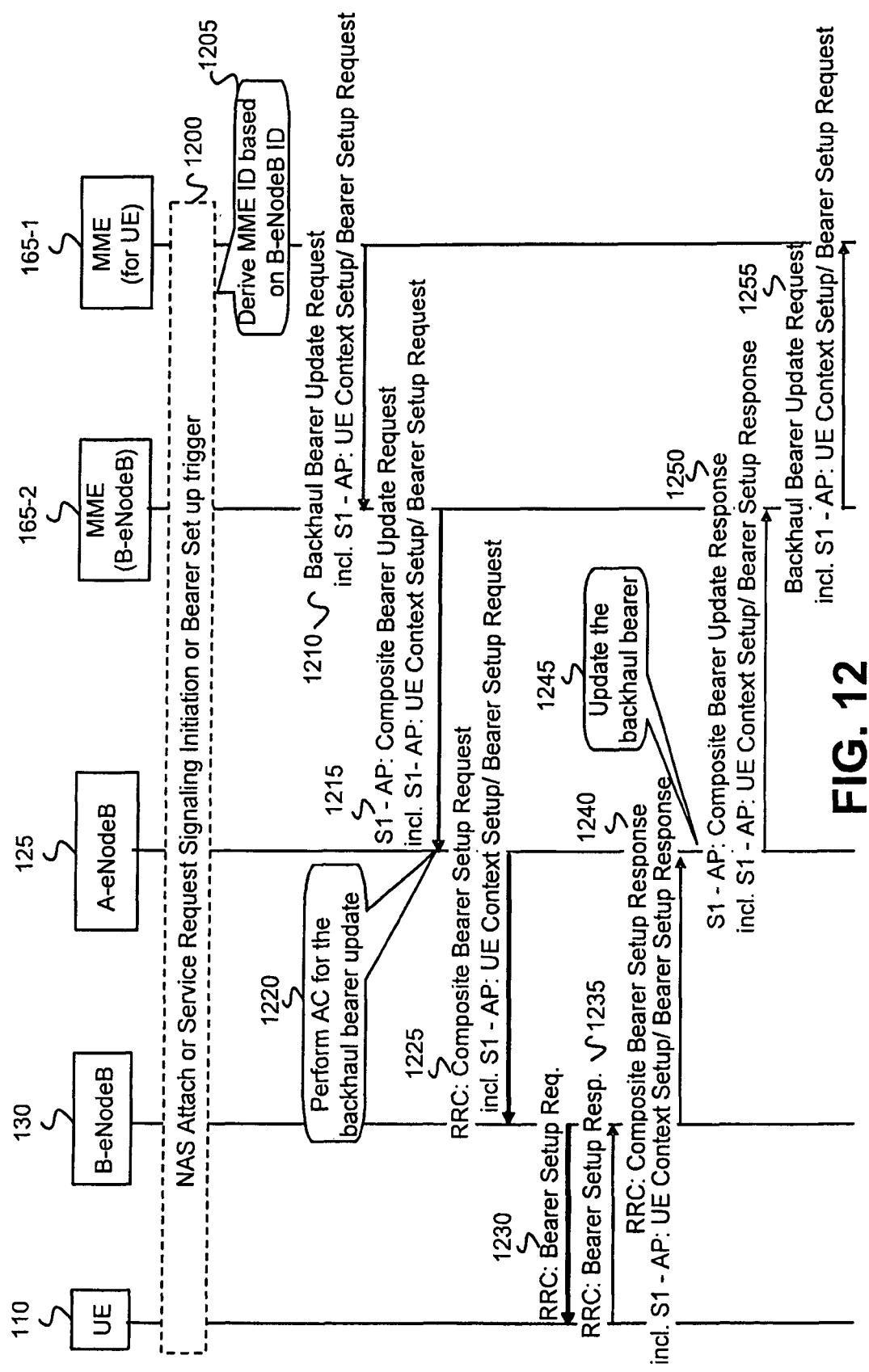
FIG. 12 is a messaging diagram associated with the exemplary process of FIG. 11.

The exemplary process may begin with the MME for the UE sending a backhaul bearer setup request to the MME for the B-eNodeB based on an attach or service request signaling, or a bearer setup trigger (block 1105). Prior to sending the backhaul bearer setup request, the MME of the UE may derive the identity of the MME serving the B-eNodeB via a translation function that can map the B-eNodeB ID to the MME ID. This may be achieved, for example, if the B-eNodeB has an identifier, such as an S-TMSI identifier, where the S-TMSI includes the MME ID. Once the MME ID of the MME serving the B-eNodeB is identified, the MME for the UE may send the backhaul bearer setup request to the identified MME serving the B-eNodeB. FIG. 12 depicts MME 165-1 sending a backhaul bearer update request 1210, based on an attach, service request signaling initiation or bearer setup trigger 1200, to MME 165-2, the identification of which may be derived 1205 from the B-eNodeB's ID. As shown in FIG. 12, backhaul bearer update request 1210 may include a UE context setup/bearer setup S1-AP message destined for the B-eNodeB within the message.

Upon receiving the backhaul bearer update request, the MME for the B-eNodeB may initiate the bearer update towards the A-eNodeB by sending a composite bearer update request to the A-eNodeB (block 1110). Prior to sending the composite bearer update request to the A-eNodeB, the MME for the B-eNodeB may map the UE bearer to a backhaul bearer and may make a decision about QoS modifications to the backhaul bearer. As an alternative to sending the composite bearer update request, the MME for the B-eNodeB may send a S1-AP bearer management message that may carry another encapsulated S1-AP message. The encapsulated S1-AP message may be copied transparently from the incoming message into the outgoing message. For example, FIG. 12 depicts MME 165-2 sending a composite bearer update request message 1215 to A-eNodeB 125 via the S1-AP interface.

The A-eNodeB may send a bearer setup request to the UE (block 1115). Upon receipt of the composite bearer update request from the MME for the B-eNodeB, the A-eNodeB may perform admission control for the bearer update and may execute an update of the backhaul bearer via bearer management signaling towards the B-eNodeB. For example, as depicted in FIG. 12, A-eNodeB 125 may perform admission control 1220 for the bearer update and may send a composite bearer setup request 1225 to B-eNodeB 130. As an alternative to sending the composite bearer setup request message, the A-eNodeB may send a S1-AP bearer management message that may carry another encapsulated S1-AP message. The encapsulated S1-AP message may be copied transparently from the incoming message into the outgoing message.

Upon receipt of the bearer setup request message from the A-eNodeB, the A-eNodeB may extract any encapsulated message and act according to the contents of the extracted message. The B-eNodeB may further establish the UE context and UE bearers and signal the UE radio bearer setup/update toward the UE by sending a bearer setup request message to the UE (block 1120). For example, FIG. 12 depicts B-eNodeB 130 sending a bearer setup request message 1230 to UE 110 via RRC bearer management messaging.

On the return path from the UE, the acknowledgement signaling may take the same multi-hop path all the way back to the MME for the UE. This return path may begin with the UE returning a bearer setup response to the B-eNodeB (block 1125). For example, FIG. 12 depicts UE 110 sending a bearer setup response message 1235 to B-eNodeB 130 via RRC bearer management messaging. Further, on the return path from the UE, the B-eNodeB may send a composite bearer setup response to the A-eNodeB (block 1130). For example, FIG. 12 depicts B-eNodeB 130 sending a composite bearer setup response 1240 to A-eNodeB 125 via RRC bearer management messaging.

Upon receipt of the bearer setup response message 1240 from the B-eNodeB, the A-eNodeB may update 1245 the backhaul bearer and further send a composite bearer update response to the MME for the B-eNodeB (block 1135). For example, FIG. 12 depicts A-eNodeB 125 sending a composite bearer update response 1250 to MME 165-2 on the return path to MME 165-1. Upon receipt of the bearer update response from the A-eNodeB, the MME for the B-eNodeB may send a backhaul bearer update request to the MME for the UE (block 1140). FIG. 12 depicts completion of the acknowledgement signaling on the return with MME 165-2 sending a backhaul bearer update request 1255 to MME 165-1.

A same multi-hop signaling based solution, as described above with respect to FIGS. 11 and 12, may also be applied to handover. In this case, the reservation of resources for the backhaul bearer may be performed at handover preparation and may be performed at the same time when the UE bearers at the target B-eNodeB are reserved. In this exemplary embodiment, X2 handover preparation messages may be sent in a multi-hop fashion via the B-eNodeB1, A-eNodeB1, A-eNodeB2 and B-eNodeB2 nodes.

Figure 13A:
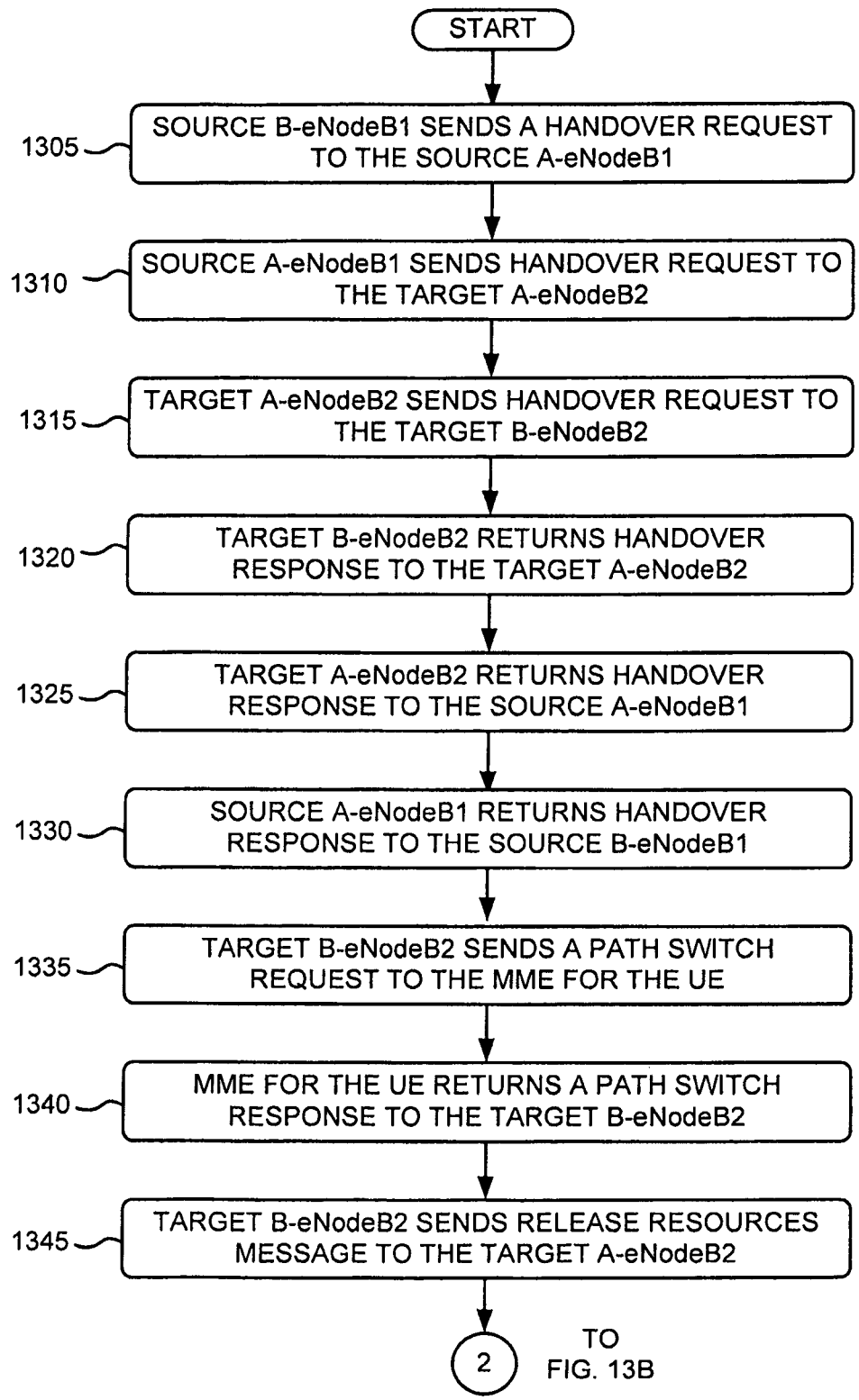
FIGS. 13A and 13B are flowcharts of an exemplary process for notifying an anchor eNode of the addition or removal of UE bearers from a backhaul link served by its self-backhauled eNodeB, in the case of handover, using multi-hop signaling.
Figure 13B:
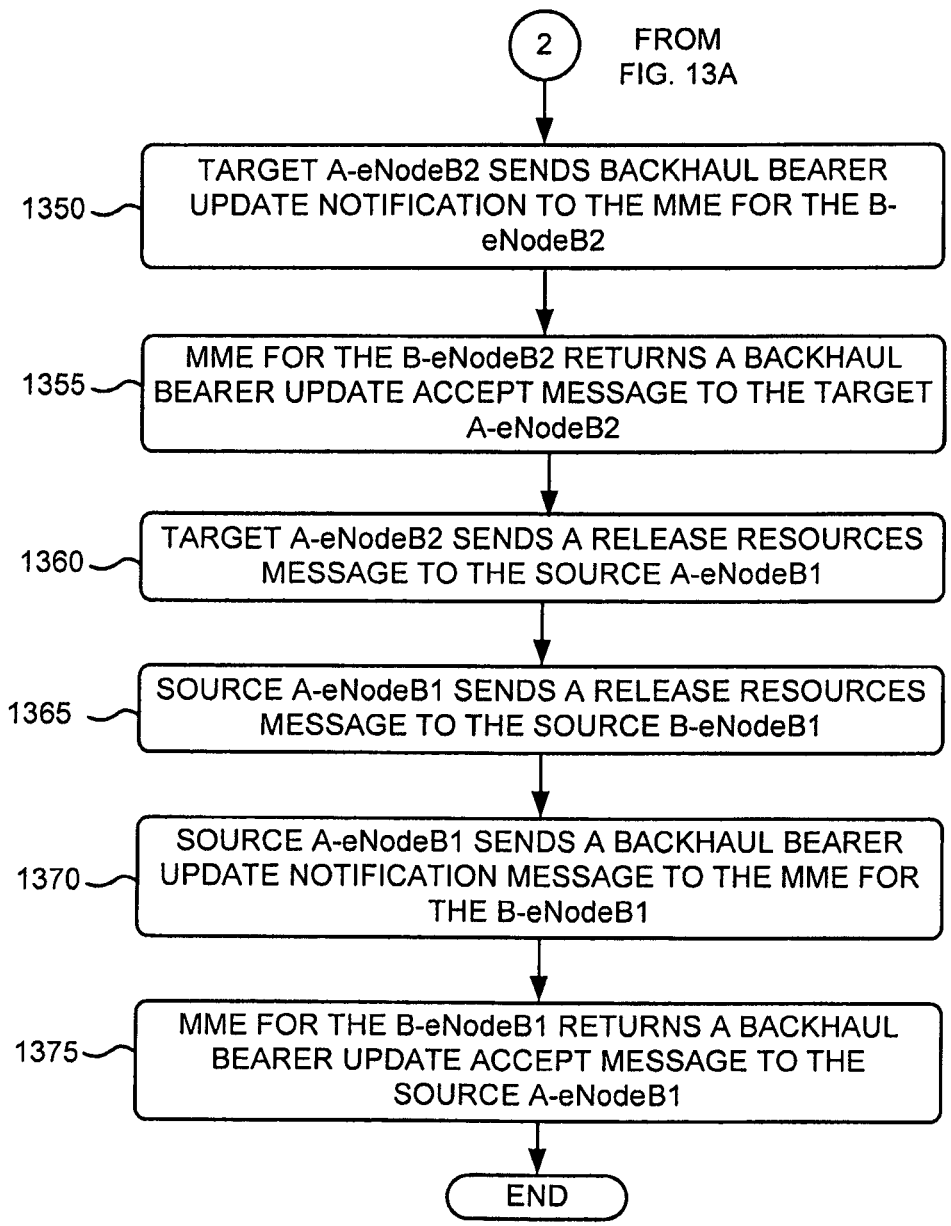

FIGS. 13A and 13B are flowcharts of an exemplary process for notifying an anchor eNodeB of the addition or removal of UE bearers from a backhaul link served by its self-backhauled eNodeB that uses multi-hop signaling. The following description of the exemplary process of FIGS. 13A and 13B is described with reference to the exemplary messaging diagram of FIG. 14 for purposes of illustration.

Figure 14:
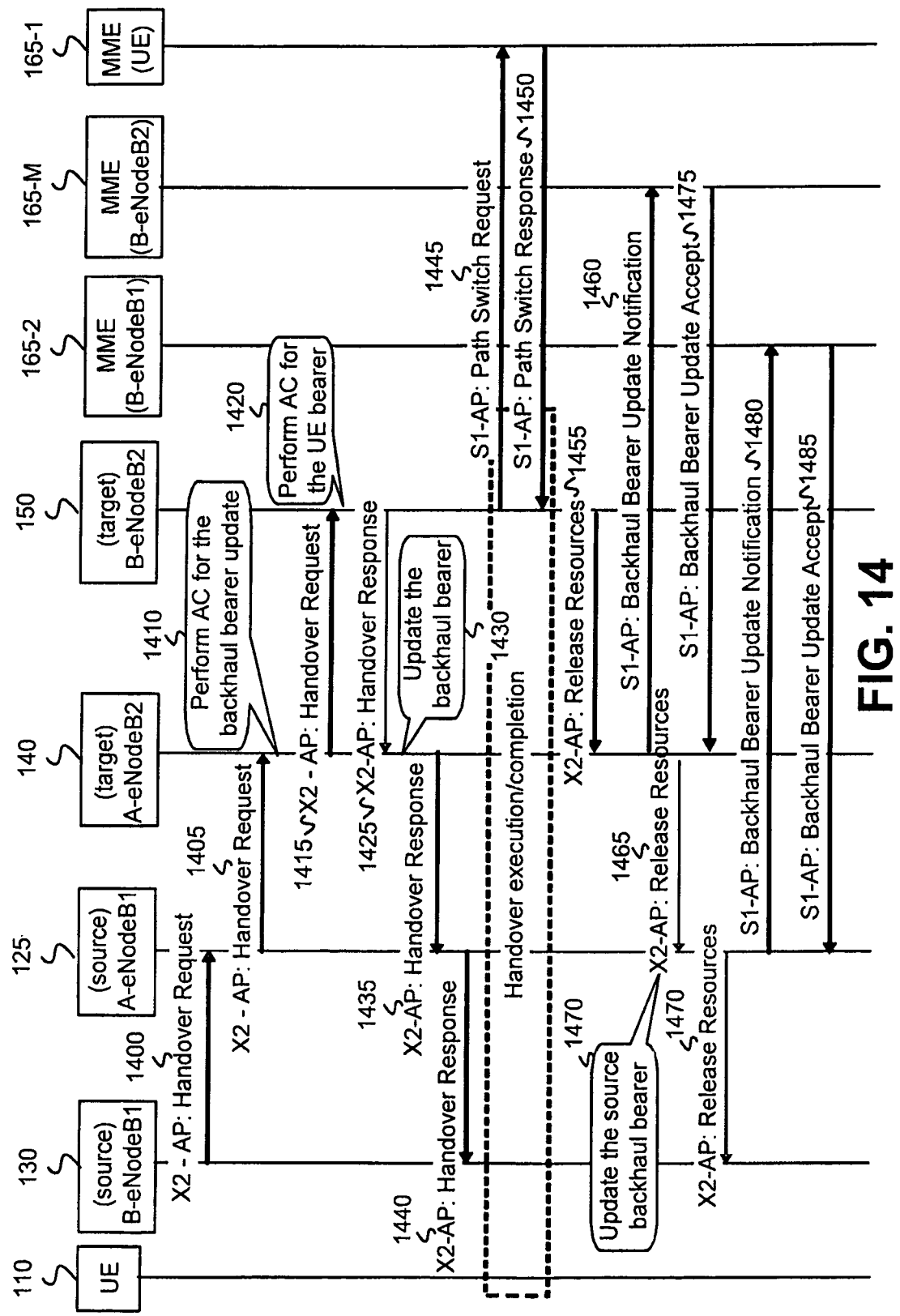
FIG. 14 is a messaging diagram associated with the exemplary process of FIGS. 13A and 13B.

The exemplary process may begin with the source B-eNodeB1 initiating handover preparation by sending a handover request to the source A-eNodeB1 (block 1305). For example, FIG. 14 depicts B-eNodeB1 130, acting as the source B-eNodeB, sending a handover request message 1400 to A-eNodeB1 125 via an X2-AP interface. Upon receipt and processing of the handover request from the B-eNodeB1, the source A-eNodeB1 may further send a handover request to the target A-eNodeB2 (block 1310). For example, FIG. 14 depicts A-eNodeB1 125 sending a handover request message 1405 to A-eNodeB2 140 via an X2-AP interface. The target A-eNodeB2 may perform admission control for the backhaul bearer to verify if enough resources are available to support the new UE bearer(s) entering the backhaul link and, if the admission control has succeeded, may send a handover request to the target B-eNodeB2 (block 1315). The A-eNodeB2 may map a given UE bearer to a specific backhaul bearer. Alternatively, the B-eNodeB2 may map the given UE bearer to the specific backhaul bearer and then admission control may subsequently be performed by the A-eNodeB2 upon receipt of the handover response message (described below). For example, FIG. 14 depicts A-eNodeB2 140 performing admission control (AC) 1410 for the backhaul bearer update and sending a handover request message 1415 to B-eNodeB2 150 via the X2-AP interface.

The target B-eNodeB2 may perform admission control for the UE bearer and then acknowledge the handover preparation by returning a handover response to the target A-eNodeB2 (block 1320). For example, FIG. 14 depicts B-eNodeB2 150 performing admission control 1420 for the UE bearer and then sending a handover response message 1425 to A-eNodeB2 140 via the X2-AP interface.

Upon receipt of the handover preparation acknowledgement, the target A-eNodeB2 may execute the reallocation of resources for the backhaul bearer to update the backhaul bearer and then return a handover response to the source A-eNodeB1 (block 1325), and the source A-eNodeB1 may further send the handover response on to the source B-eNodeB1 (block 1330). For example, FIG. 14 depicts A-eNodeB2 140 updating the backhaul bearer 1430 and then sending a handover response message 1435 to A-eNodeB1 125 via the X2-AP interface. FIG. 14 further depicts A-eNodeB1 125 sending a handover response message 1440 to B-eNodeB1 130 via the X2-AP interface.

Handover execution may be completed with the target B-eNodeB2 sending a path switch request to the MME for the UE (block 1335) and the MME for the UE returning a path switch response to the target B-eNodeB2 (block 1340). For example, FIG. 14 depicts B-eNodeB2 150 sending a path switch request message 1445 to MME 165-1 via the S1-AP interface and MME 165-1 replying by returning a path switch response message 1450 to B-eNodeB2 150.

The target B-eNodeB may then initiate a "release resources" procedure toward the source B-eNodeB1, which may involve multi-hop signaling, by sending a release resources message to the target A-eNodeB2 (block 1345). For example, FIG. 14 depicts B-eNodeB2 150 sending a release resources message 1455 to A-eNodeB2 140 via the X2-AP interface.

The target A-eNodeB2 may, upon receipt of the release resources message, notify the MME for the B-eNodeB2 regarding the changed backhaul bearer attributes by sending a backhaul bearer update notification to the MME for the B-eNodeB2 (block 1350). For example, FIG. 14 depicts A-eNodeB2 140 sending a backhaul bearer update notification 1460 to MME 165-M via the S1-AP user interface. In response to the update notification message, the MME for the B-eNodeB2 may return a backhaul bearer update accept message to the target A-eNodeB2 (block 1365) acknowledging the notification of the changed backhaul bearer attributes. For example, FIG. 14 depicts MME 165-M returning a backhaul bearer update accept message 1475 to A-eNodeB2 140 via the S1-AP interface.

Subsequent to receipt of the release resources message from the target B-eNodeB2, the target A-eNodeB2 may send a release resources message to the source A-eNodeB1 (block 1360) and, upon update of the source backhaul bearer, the source A-eNodeB1 may further send a release resources message to the source B-eNodeB1 (block 1365). For example, FIG. 14 depicts A-eNodeB2 140 sending a release resources message 1465 via the X2-AP interface to A-eNodeB1 125 and A-eNodeB1 125 then updating 1470 the source backhaul bearer. FIG. 14 further depicts A-eNodeB1 125 sending a release resources message 1470 to B-eNodeB1 130 via the X2-AP interface.

To notify the MME for the B-eNodeB1 regarding the changed backhaul bearer attributes, the source A-eNodeB1 may send a backhaul bearer update notification message to the MME for the B-eNodeB1 (block 1370) and the MME for the B-eNodeB1 may acknowledge the notification by returning a backhaul bearer update accept message to the source A-eNodeB1 (block 1375). For example, FIG. 14 depicts A-eNodeB1 125 sending a backhaul bearer update notification 1480 to MME 165-2 to notify MME 165-2 of the changed backhaul bearer attributes and MME 165-2 acknowledges receipt of the notification by returning a backhaul bearer update accept message 1485 to A-eNodeB1 125.

Figure 15A:
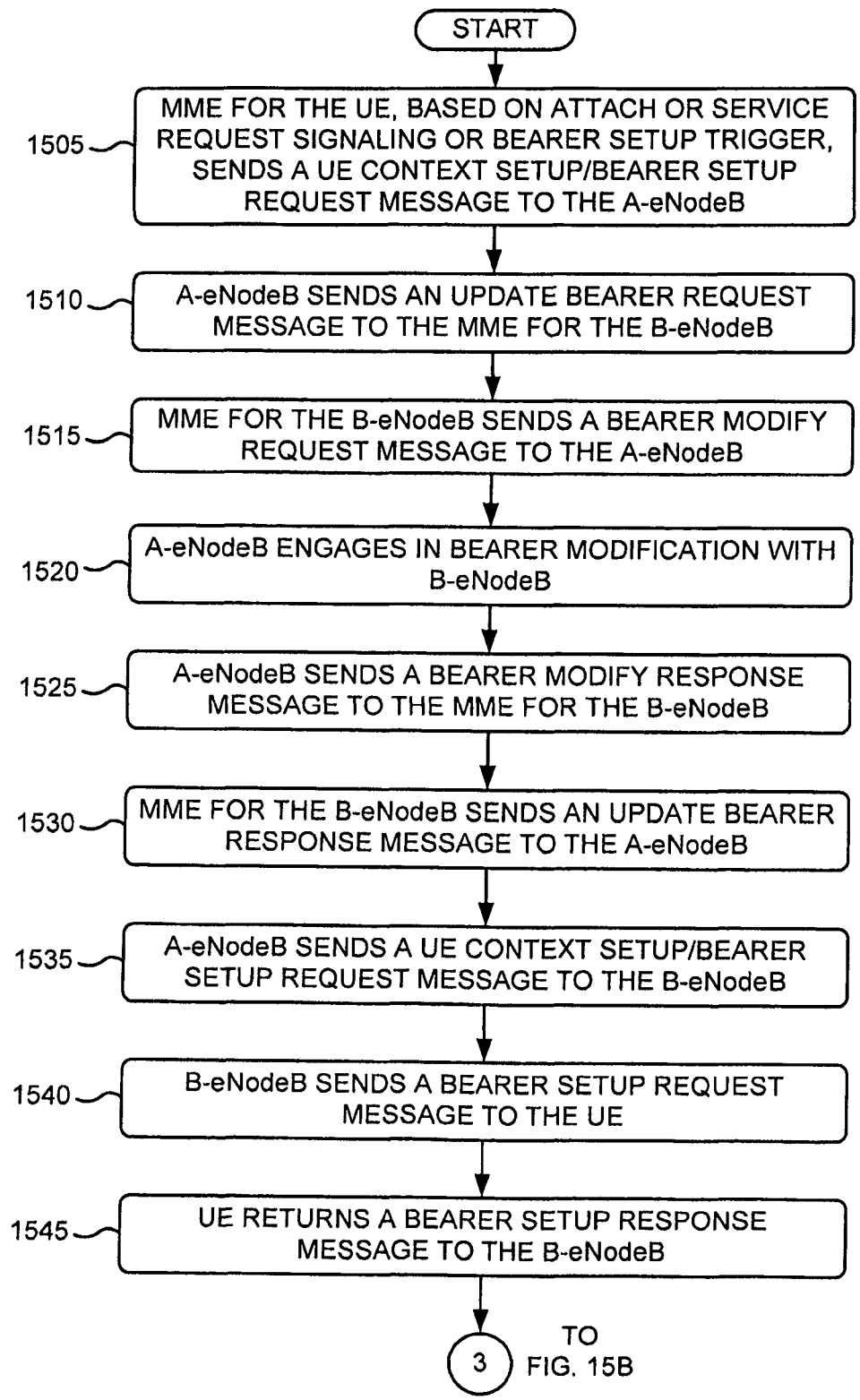
FIGS. 15A and 15B are flowcharts of an exemplary process that uses "proxy" S1/X2 signaling to notify the anchor eNodeB about the addition or removal of UE bearers to/from the backhaul link.
Figure 15B:
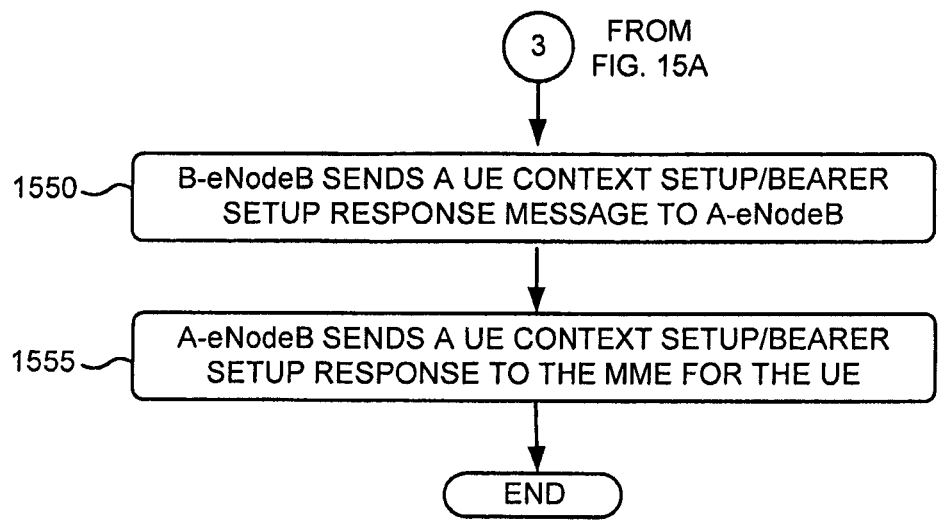

FIGS. 15A and 15B are flowcharts of an exemplary process that uses "proxy" S1/X2 signaling to notify the anchor eNodeB about the addition or removal of UE bearers to/from the backhaul link. In the exemplary process of FIGS. 15A and 15B, the UE may be seen from the core network as if it would be connected to the A-eNodeB directly. As seen from the MME of the UE point of view, there may be no difference in the signaling messages as compared to a case when the UE is served by a regular eNodeB instead of a self-backhauled eNodeB. In the exemplary embodiment described in FIGS. 15A and 15B, S1 signaling messages may be sent to the anchor eNodeB, which may perform modifications to the messages, as necessary for the proxy translation, and send the messages on the destination. This "proxy" function in the A-eNodeB, thus, results in the B-eNodeB believing that it is communicating with the MME while its messages are intercepted and modified by the A-eNodeB. Similarly, while the MME may only communicate with the A-eNodeB, its messages may be modified and forwarded further to the B-eNodeB. The following description of the exemplary process of FIGS. 15A and 15B is described with reference to the exemplary messaging diagram of FIG. 16 for purposes of illustration. The exemplary messaging diagram of FIG. 16 illustrates an exemplary signaling sequence in the case where there may be an attach request, service request or bearer setup, and "proxy" S1/X2 signaling may be used to notify the anchor eNodeB of the addition or removal of UE bearers to/from the backhaul link.

The exemplary process may begin with the MME for the UE, based on an attach or service request signaling or bearer setup trigger, sending a UE context setup/bearer setup request message to the A-eNodeB (block 1505). The MME serving the UE believes that the A-eNodeB is serving the UE so it sends the corresponding context setup/bearer setup message to the A-eNodeB. For example, FIG. 16 depicts the occurrence 1600 of an attach, service request signaling initiation, or bearer setup trigger, and MME 165-1 sending a UE context setup/bearer setup request message 1605 to A-eNodeB 125 responsive to the attach, service request or bearer setup trigger.

The receipt of the UE context setup/bearer setup request message at the A-eNodeB may act as a trigger to initiate the update of the backhaul bearer towards the MME serving the B-eNodeB. The A-eNodeB may initiate the update of the backhaul bearer by sending an update bearer request message to the MME for the B-eNodeB (block 1510). For example, FIG. 16 depicts A-eNodeB 125 triggering 1610 the update of the backhaul bearer towards MME 165-2 based on receipt of message 1605. As shown in FIG. 16, A-eNodeB 125 initiates backhaul bearer update procedures 1615 by sending an update bearer request 1620 to MME 165-2 via the S11 interface. In an exemplary implementation where the MME serving the B-eNodeB may be integrated into the A-eNodeB, no signaling may be required for the backhaul bearer update, except for RRC bearer modification signaling towards the B-eNodeB.

The MME for the B-eNodeB may send a bearer modify request message to the A-eNodeB (block 1515) based on receipt of the update bearer request from the A-eNodeB. For example, FIG. 16 depicts MME 165-2 sending a bearer modify request message 1625 to A-eNodeB 125 via the S1-AP interface.

The A-eNodeB may determine which backhaul bearer that the UE bearer may be mapped to. The A-eNodeB may then engage in bearer modification with the B-eNodeB (block 1520) via, for example, RRC signaling. Upon completion of the bearer modification, the A-eNodeB may send a bearer modify response message to the MME for the B-eNodeB (block 1525) and the MME for the B-eNodeB may complete the backhaul bearer update process by returning an update bearer response message to the A-eNodeB (block 1530). For example, FIG. 16 depicts A-eNodeB 125 engaging in RRC bearer modification 1630 with B-eNodeB 130 via RRC signaling and then sending a bearer modify response message 1635 to MME 165-2 via the S1-AP interface. As further shown in FIG. 16, MME 165-2 responds by sending an update bearer response message 1640 to A-eNodeB 125 via the S11 interface.

The A-eNodeB may send a UE context setup/bearer setup request message to the B-eNodeB (block 1535). The B-eNodeB, in turn, may send a bearer setup request message to the UE (block 1540) which may then return a bearer setup response message to the B-eNodeB (block 1545). For example, FIG. 16 depicts A-eNodeB 125 sending a UE context setup/bearer setup request 1645 via an S1proxy-AP interface and B-eNodeB 130 sending a bearer setup request message 1650 via RRC signaling to UE 110. FIG. 16 further depicts UE 110 returning a bearer setup response message 1655 to B-eNode 130.

Backhaul bearer modification may complete with the B-eNodeB sending a UE context setup/bearer setup response message to the A-eNodeB (block 1550), which may modify the message and send the UE context setup/bearer setup response to the MME for the UE (block 1555). For example, FIG. 16 depicts B-eNodeB 130 sending a UE context setup/bearer setup response message 1660 to A-eNodeB 125. FIG. 16 further depicts A-eNodeB 125 modifying 1665 message 1660 and sending it to MME 165-1 as UE context setup/bearer setup response message 1670.

Figure 17A:
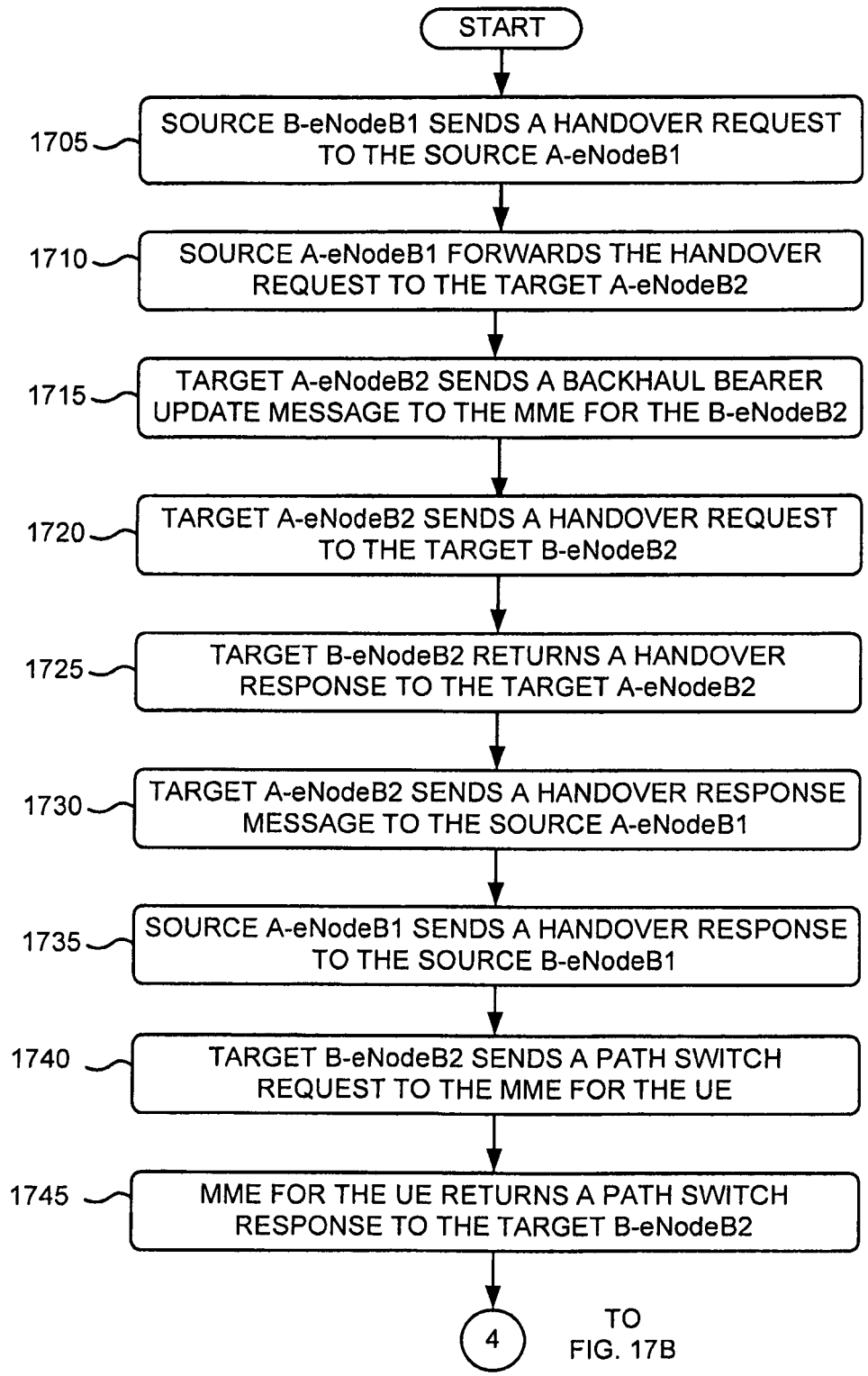
FIGS. 17A and 17B are flowcharts of an exemplary process that uses "proxy" S1/X2 signaling to notify the anchor eNodeB about the addition or removal of UE bearers to/from the backhaul link in the case where the UE is being handed off from one cell to another cell.
Figure 17B:
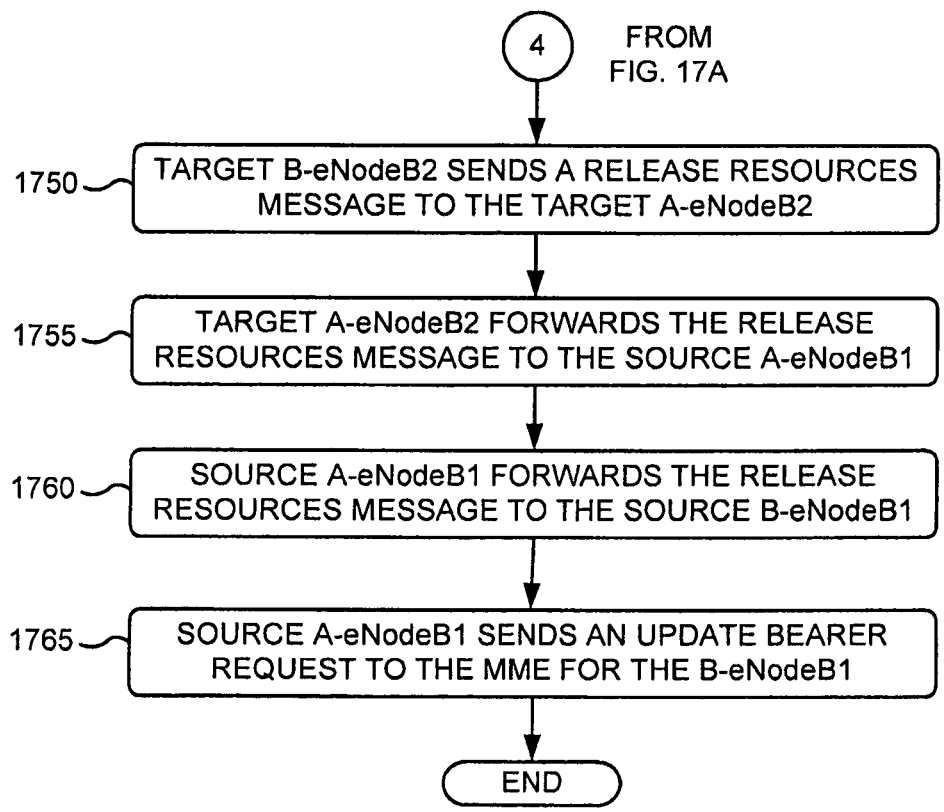

FIGS. 17A and 17B are flowcharts of an exemplary process that uses "proxy" S1/X2 signaling to notify the anchor eNodeB about the addition or removal of UE bearers to/from the backhaul link in the case where the UE is being handed off from one cell to another cell. The following description of the exemplary process of FIGS. 17A and 17B is described with reference to the exemplary messaging diagram of FIG. 18 for purposes of illustration.

Figure 18:
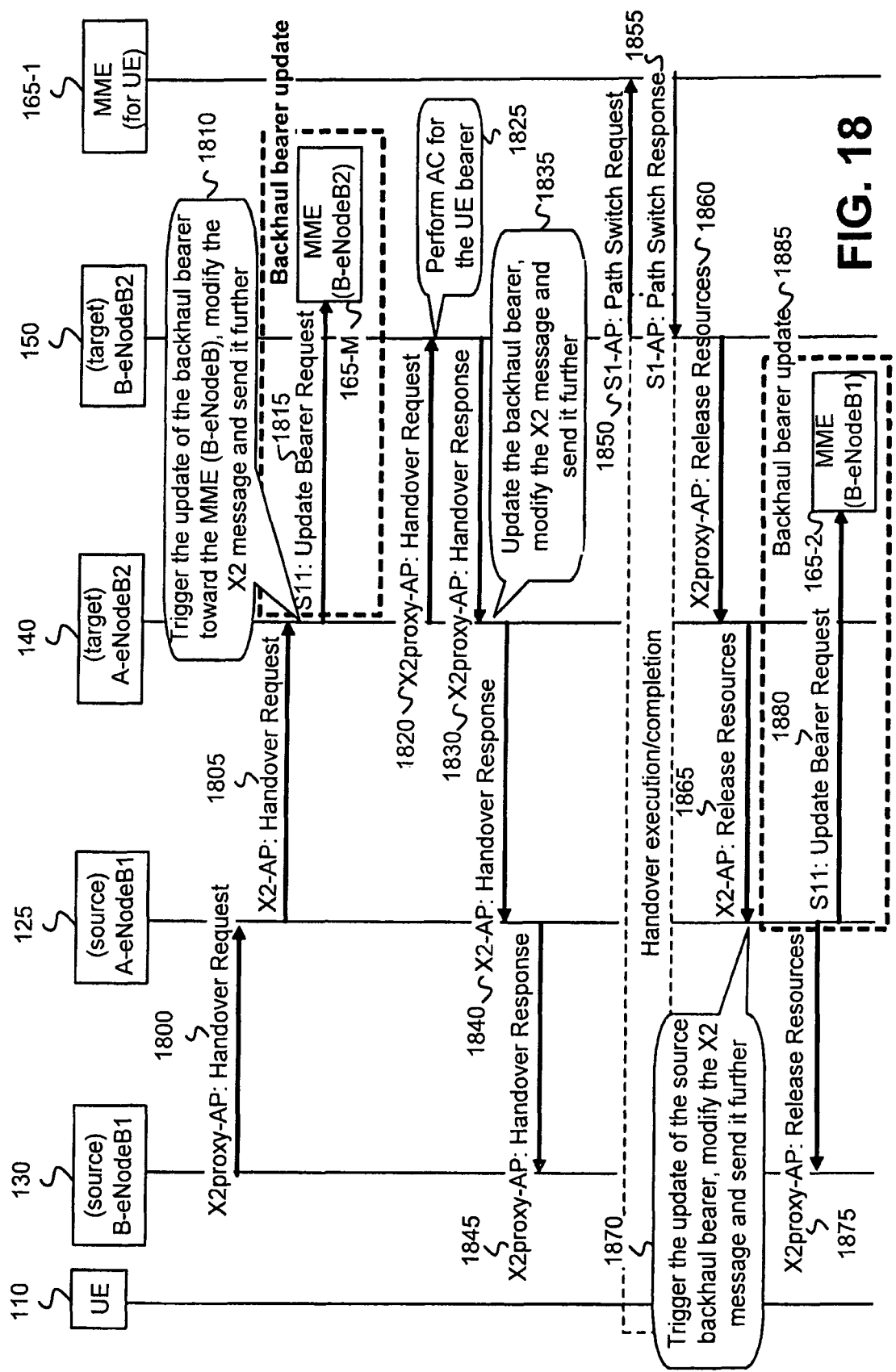
FIG. 18 is a messaging diagram associated with the exemplary process of FIGS. 17A and 17B.

The exemplary process may begin with the source B-enodeB1 sending a handover request to the source A-eNodeB1 (block 1705) and the source A-eNodeB1 forwarding the handover request to the target A-eNodeB2 (block 1710). For example, FIG. 18 depicts B-eNodeB1 130 sending a handover request message 1800 via the X2proxy-SP interface and A-eNodeB1 125 forwarding the handover request message 1805 to A-eNodeB2 140 via the X2-AP interface.

Upon receipt of the handover request, the target A-eNodeB2 may begin the backhaul bearer update procedure by sending a backhaul bearer update message to the MME for the B-eNodeB2 (block 1715). For example, FIG. 18 depicts A-eNodeB2 140 sending update bearer request message 1815 to MME 165-M. In an exemplary implementation where the MME serving the B-eNodeB may be integrated into the A-eNodeB, no signaling towards the MME for the B-eNodeB may be required for the backhaul bearer update, except for RRC bearer modification signaling towards the B-eNodeB, which may be combined with the X2-AP handover request message. The target A-eNodeB2 may then forward the handover request message on to the target B-eNodeB2 (block 1720). The target B-eNodeB2 150 may perform admission control for the UE bearer and then may return a handover response to the target A-eNodeB2 (block 1725). For example, FIG. 18 depicts A-eNodeB2 140 sending a handover request message 1820 via the X2proxy-AP interface to B-eNodeB2 150, and B-eNodeB2 150 performing 1825 admission control for the UE bearer and then returning a handover response message 1830 via the X2proxy-AP interface.

Upon receipt of the handover response from the target B-eNodeB2, the target A-eNodeB2 may update the backhaul bearer and then send a handover response message to the source A-eNodeB1 (block 1730). The source A-eNodeB1 may send a handover response on to the source B-eNodedB1 (block 1735). To complete the handover process, the target B-eNodeB2 may send a path switch request to the MME for the UE (block 1740) and the MME for the UE may return a path switch response to the target B-eNodeB2 (block 1745). In case the proxy operation is used also on the S1 interface, the target B-eNodeB2 may send the path switch request to the A-eNodeB2 which, in turn, may translate and forward the message further to the MME for the UE. For example, FIG. 18 depicts A-eNodeB2 140 receiving handover response message 1830, updating 1835 the backhaul bearer and appropriately modifying the X2 message, and forwarding the handover response message 1840 to A-eNodeB1 125 via the X2-AP interface. As further shown in FIG. 18, A-eNodeB1 125 may forward the handover response message 1845 to B-eNodeB1 130. FIG. 18 also depicts completion of the handover process with B-eNodeB2 150 sending a path switch request message 1850 to MME 165-1 via the S1-AP interface and MME 165-1 returning a path switch response 1855 to B-eNodeB2 150.

Subsequent to completion of the handover process, the target B-eNodeB2 may send a release resources message to the target A-eNodeB2 (block 1750), the target A-eNodeB2 may forward the release resources messages to the source A-eNodeB1 (block 1755), and the source A-eNodeB1 may forward the release resources message to the source B-eNodeB1 (block 1765). In an exemplary implementation where the MME serving the B-eNodeB may be integrated into the A-eNodeB, no signaling towards the MME for the B-eNodeB may be required for the backhaul bearer update, except for RRC bearer modification signaling towards the B-eNodeB, which may be combined with the X2-AP release resources message. For example, FIG. 18 depicts B-eNodeB2 150 sending a release resources message 1860 to A-eNodeB2 140 via the X2proxy-AP interface and A-eNodeB 140 forwarding a release resources message 1865 to A-eNodeB1 125 via the X2-AP interface. FIG. 18 further depicts A-eNodeB1 125 forwarding a release resources message 1875 to B-eNodeB1 130 via the X2proxy-AP interface.

The exemplary process for notifying the anchor eNodeB about the addition or removal of UE bearers to/from the backhaul link when the UE is handed off to another cell may complete with a backhaul bearer update that includes the source A-eNodeB1 sending an update bearer request to the MME for the B-eNodeB1 (block 1765). For example, FIG. 18 depicts a backhaul bearer update 1885 being initiated by A-eNodeB1 125 sending and update bearer request message 1880 to MME 165-2 via the S11 interface.

Figure 19A:
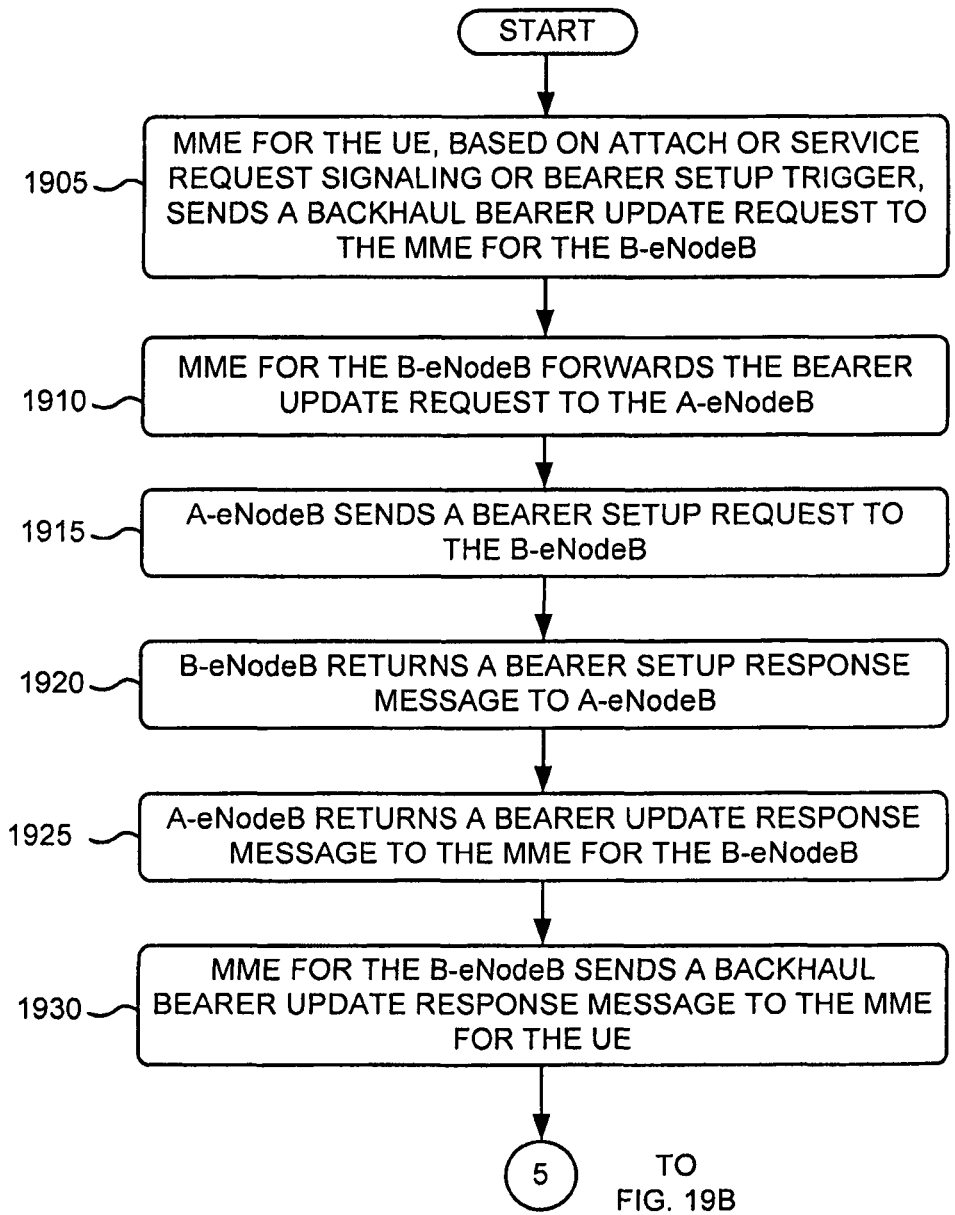
FIGS. 19A and 19B are flowcharts of an exemplary process that uses "direct" sequential S1/X2 signaling to notify the anchor eNodeB about the addition or removal of UE bearers to/from the backhaul link.
Figure 19B:
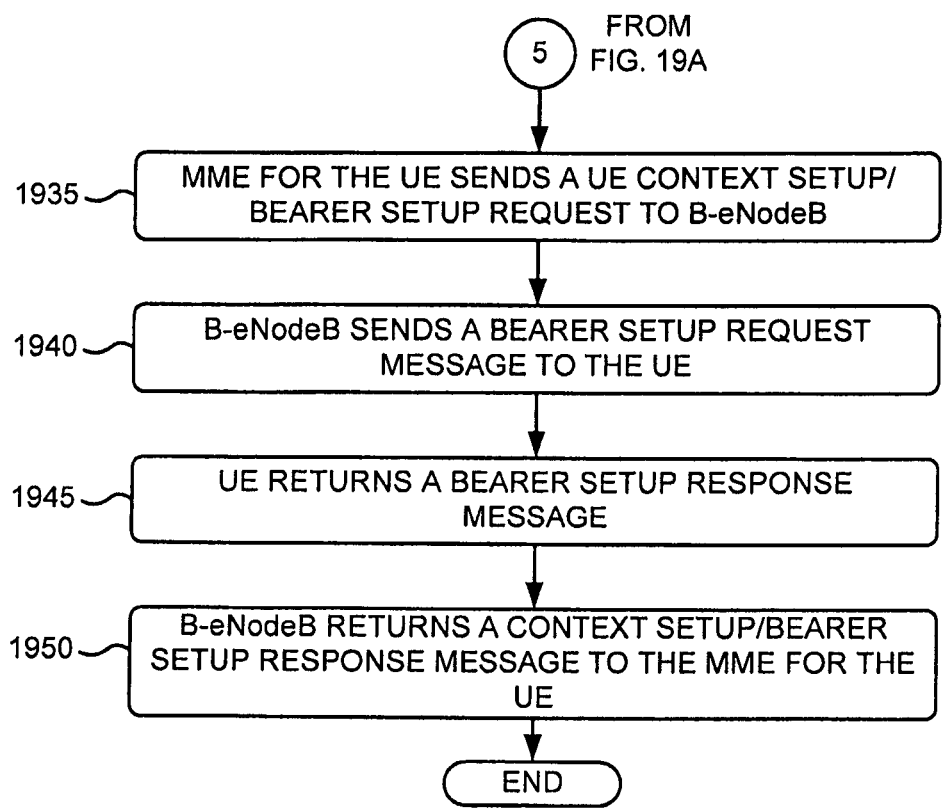

FIGS. 19A and 19B are flowcharts of an exemplary process that uses "direct" sequential S1/X2 signaling to notify the anchor eNodeB about the addition or removal of UE bearers to/from the backhaul link. The following description of the exemplary process of FIGS. 19A and 19B is described with reference to the exemplary messaging diagram of FIG. 20 for purposes of illustration.

Figure 20:
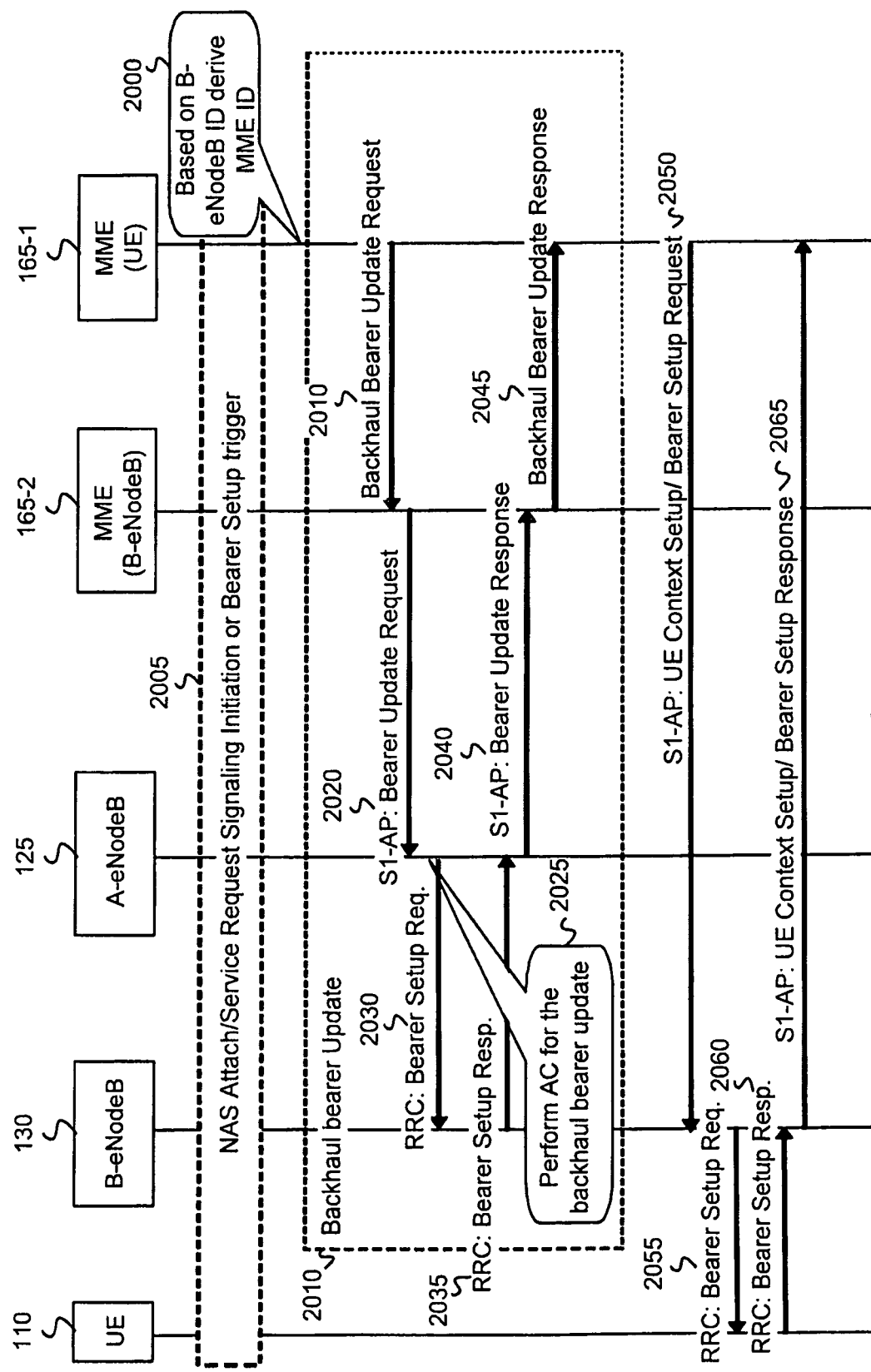
FIG. 20 is a messaging diagram associated with the exemplary process of FIGS. 19A and 19B.

The exemplary process may begin the MME for the UE, based on an attach or service request signaling or bearer setup trigger, sending a backhaul bearer update request to the MME for the B-eNodeB (block 1905). The MME for the UE may need to identify the MME serving the B-eNodeB via a translation function that can map the B-eNodeB ID to the MME ID. For example, if the B-eNodeB has a S-TMSI identifier, this identifier may be used to derive the ID of the MME. FIG. 20 depicts MME 165-1 deriving 2000 the MME ID of the MME serving the B-eNodeB and sending a backhaul bearer request 2005 based on an attach, service request signaling or a bearer setup trigger 2010. The backhaul bearer update procedure may be triggered either before the UE context and bearer establishment at the B-eNodeB or, alternatively, it can be done after the UE context and the bearer have been established in the B-eNodeB.

Upon receipt of the backhaul bearer update request, the MME for the B-eNodeB may execute the bearer update procedure towards the A-eNodeB by forwarding the bearer update request to the A-eNodeB (block 1910). The MME for the B-eNodeB may decide to which backhaul bearer a given UE bearer may be mapped to and may update the QoS of the given backhaul bearer accordingly. For example, FIG. 20 depicts MME 165-2 sending a bearer update request message 2020 to A-eNodeB 125 via the S1-AP interface and A-eNodeB 125 performing 2025 admission control for the backhaul bearer update based on receipt of bearer update request 2020.

The bearer update procedure may continue with the A-eNodeB sending a bearer setup request to the B-eNodeB (block 1915), the B-eNodeB returning a bearer setup response message to the A-eNodeB (block 1920), the A-eNodeB sending a bearer update response to the MME for the B-eNodeB (block 1925) and the MME for the B-eNodeB sending a backhaul bearer update response to the MME for the UE (block 1930) to complete the backhaul bearer update procedure. For example, FIG. 20 depicts A-eNodeB 125 sending a bearer setup request message 2030 and B-eNodeB returning a bearer setup response message 2035 via RRC signaling. FIG. 20 further depicts A-eNodeB sending a bearer update response message 2040 via the S1-AP interface and MME 165-2 sending a backhaul bearer update response message 2045 to MME 165-1 to complete backhaul bearer update procedure 2010.

The MME for the UE may further execute the UE bearer update by sending a UE context setup/bearer setup request to the B-eNodeB that serves the UE (block 1935) and the B-eNodeB may further send a bearer setup request message to the UE (block 1940). To acknowledge the UE bearer update, the UE may return a bearer setup response message to the B-eNodeB (block 1945) and the B-eNodeB may return a context setup/bearer setup response message to the MME for the UE (block 1950) to complete the acknowledgement of the UE bearer update. For example, FIG. 20 depicts MME 165-1 sending a UE context setup/bearer setup request message 2050 via the S1-AP interface to B-eNodeB 130 and B-eNodeB 130 sending a bearer setup request message 2055 to UE 110 to request the bearer update. As further shown in FIG. 20, UE 110 may return a bearer setup response message 2060 to B-eNodeB 130 and B-eNodeB 130 may return a UE context setup/bearer setup response message 2065 to MME 165-1.

Figure 21A:
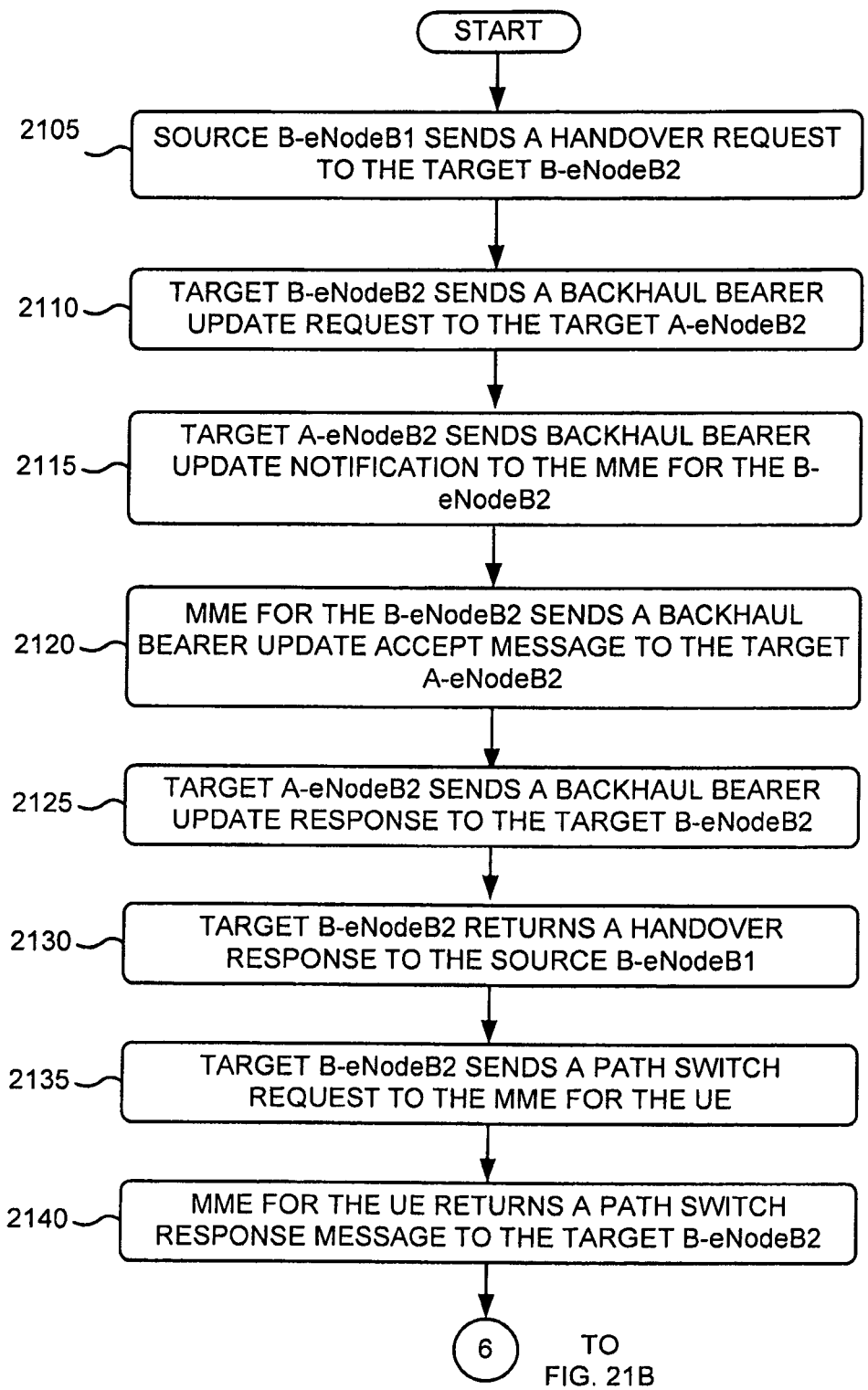
FIGS. 21A and 21B are flowcharts of an exemplary process that uses "direct" sequential S1/X2 signaling to notify the anchor eNodeB about the addition or removal of UE bearers to/from the backhaul link in a case where the UE is being handed off from one cell to another cell.
Figure 21B:
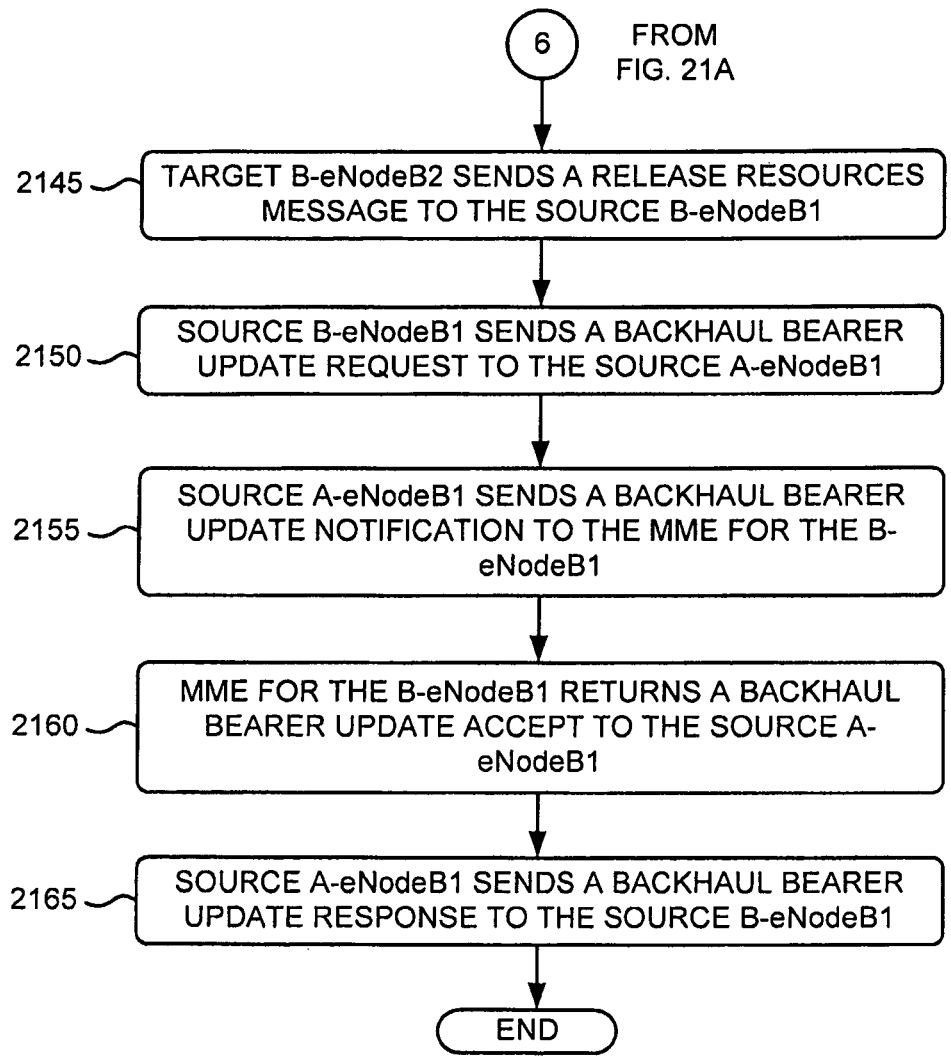

FIGS. 21A and 21B are flowcharts of an exemplary process that uses "direct" sequential S1/X2 signaling to notify the anchor eNodeB about the addition or removal of UE bearers to/from the backhaul link in a case where the UE is being handed off from one cell to another cell. The following description of the exemplary process of FIGS. 21A and 21B is described with reference to the exemplary messaging diagram of FIG. 22 for purposes of illustration.

Figure 22:
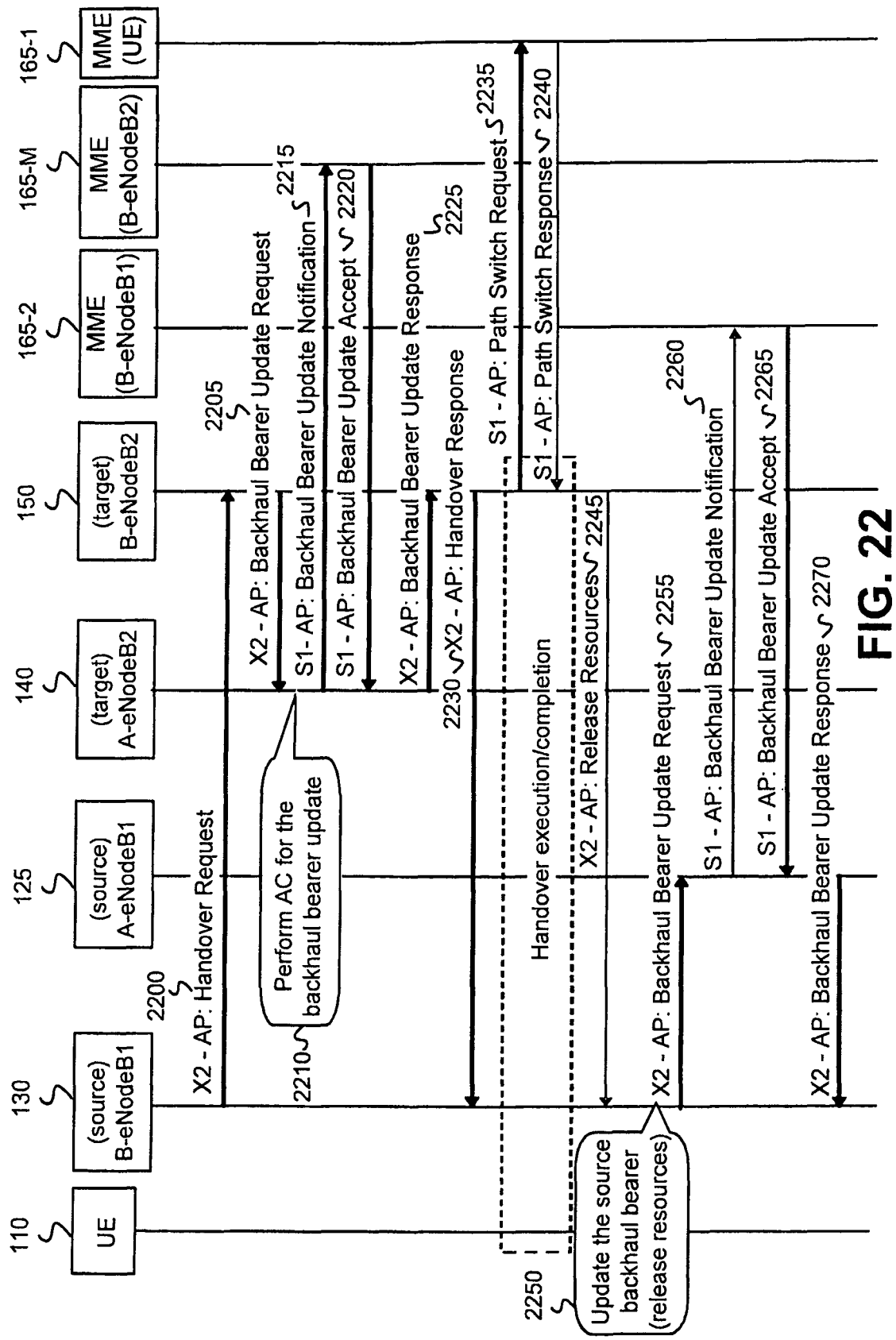
FIG. 22 is a messaging diagram associated with the exemplary process of FIGS. 21A and 21B.

The exemplary process may begin the source B-eNodeB1 sending a handover request to the target B-eNodeB2 (block 2105). For example, FIG. 22 depicts B-eNodeB1 130 sending a handover request message 2200 to B-eNodeB2 150 via an X2-AP interface. Upon receipt of the handover request, the target B-eNodeB2 may send a backhaul bearer update request to the target A-eNodeB2 (block 2110) which, in turn, may send a backhaul bearer update notification to the MME for the B-eNodeB2 (block 2115). The MME for the B-eNodeB2 may acknowledge the backhaul bearer update by returning a backhaul bearer update accept message to the target A-eNodeB2 (block 2120). For example, FIG. 22 depicts B-eNodeB2 150 sending a backhaul bearer update request message 2205 to A-eNodeB2 140 via the X2-AP interface and, upon receipt of message 2205, A-eNodeB2 140 sending a backhaul bearer update notification message 2215 to MME 165-M. FIG. 22 further depicts MME 165-M returning a backhaul bearer update accept message 2220 to A-eNodeB2 140 to acknowledge the backhaul bearer update.

The target A-eNodeB2 may send a backhaul bearer update response to the target B-eNodeB2 (block 2125) acknowledging the backhaul bearer update to the B-enodeB2. In response to receipt of the backhaul bearer update response, the target B-eNodeB2 may return a handover response to the source B-eNodeB1 (block 2130) to indicate the acceptance of the handover. For example, FIG. 22 depicts A-eNodeB2 140 returning a backhaul bearer update response message 2225 via the X2-AP interface to B-eNodeB2 150, and B-eNodeB2 150 sending a handover response message 2230 to B-eNodeB1 130 via the X2-AP interface. Handover may complete with the target B-eNodeB2 sending a path switch request message to the MME for the UE (block 2135) and the MME for the UE returning a path switch response message (block 2140) to the target B-eNodeB2. FIG. 22 further depicts B-eNodeB2 150 sending a path switch request message 2235 to MME 165-1 via the S1-AP interface and MME 165-1 returning a path switch response message 2240 to B-eNodeB2 150 via the S1-AP interface.

The target B-eNodeB2 may send a release resources message to the source B-eNodeB1 (block 2145) to notify the source B-eNodeB1 of the backhaul bearer update. For example, FIG. 22 depicts B-eNodeB2 150 sending a release resources message 2245 to B-eNodeB1 130 via the X2-AP interface and B-eNodeB1 updating 2250 the source backhaul bearer and releasing resources in response to release resources message 2245.

Upon updating of the source backhaul bearer, the source B-eNodeB1 may send a backhaul bearer update request to the source A-eNodeB1 (block 2150), the source A-eNodeB1 may send a backhaul bearer update notification to the MME for the B-eNodeB1 (block 2155), the MME for the B-eNodeB1 may return a backhaul bearer update accept the source A-eNodeB1 (block 2160) and the source A-eNodeB1 may send a backhaul bearer update response to the source B-eNodeB1 (block 2165) to complete the backhaul bearer update. For example, FIG. 22 depicts B-eNodeB1 130 sending a backhaul bearer update request message 2255 to A-eNodeB1 125 via the X2-AP interface and A-eNodeB1 125 further sending a backhaul bearer update notification message 2260 to MME 165-2 via the S1-AP interface. FIG. 22 further depicts MME 165-2 returning a backhaul bearer update accept message 2265 to A-eNodeB1 125 and A-eNodeB1 125 returning a backhaul bearer update response message 2270 to B-eNodeB1 130 to complete the backhaul bearer update.

A separate bearer type for backhaul bearers may be introduced in an additional exemplary embodiment that may have additional attributes that currently do not exist for single UE bearers. Such an additional attribute of a backhaul bearer may include the number of UE bearers multiplexed into the given backhaul bearer. This information may be useful, for example, for the anchor eNodeB radio scheduler (e.g., to set the fair share weight of the backhaul bearer in proportion to the number of encapsulated UE bearers).

The foregoing description of implementations provides illustration and description, but is not intended to be exhaustive or to limit the invention to the precise form disclosed. Modifications and variations are possible in light of the above teachings, or may be acquired from practice of the invention. For example, while series of blocks have been described with regard to FIGS. 7A, 7B, 9, 11, 13A, 13B, 15A, 15B, 17A, 17B, 19A, 19B, 21A and 21B, the order of the blocks may be modified in other implementations consistent with the principles of the invention. Further, non-dependent blocks may be performed in parallel.

Aspects of the invention may also be implemented in methods and/or computer program products. Accordingly, the invention may be embodied in hardware and/or in software (including firmware, resident software, microcode, etc.). Furthermore, the invention may take the form of a computer program product on a computer-usable or computer-readable storage medium having computer-usable or computer-readable program code embodied in the medium for use by or in connection with an instruction execution system. The actual software code or specialized control hardware used to implement the embodiments described herein is not limiting of the invention. Thus, the operation and behavior of the embodiments were described without reference to the specific software code—it being understood that one of ordinary skill in the art would be able to design software and control hardware to implement the aspects based on the description herein.

Furthermore, certain portions of the invention may be implemented as "logic" that performs one or more functions. This logic may include hardware, such as an application specific integrated circuit or field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

It should be emphasized that the term "comprises/comprising" when used in this specification is taken to specify the presence of stated features, integers, steps, components or groups but does not preclude the presence or addition of one or more other features, integers, steps, components or groups thereof.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by a self-backhauled base station for managing bearers over a first wireless link between the self-backhauled base station and a base station, wherein the self-backhauled base station serves one or more user equipments (UEs) via one or more second wireless links in a network, the method comprising:
identifying changes in at least one of the number and the characteristics of UE bearers multiplexed onto a backhaul bearer associated with the first wireless link;
dynamically reconfiguring resources allocated to the backhaul bearer based on the identified changes;
sending a message requesting quality of service (QoS) modifications to a mobility management entity (MME) associated with the network; and
modifying the backhaul bearer, at the self-backhauled base station, based on the requested QoS modifications.

2. The method of claim 1, where the message is a Non-Access Stratum (NAS) protocol message used to initiate a UE requested bearer resource allocation procedure or a UE requested Packet Data Network (PDN) connectivity procedure.

3. The method of claim 2, where said sending is triggered by the reception of a UE context setup, bearer setup/modification or release from an MME serving a UE of the one or more UEs, or is triggered by a handover initiation message received from another base station.

4. The method of claim 1, further comprising signaling from the self-backhauled base station to the base station to notify the base station regarding addition or removal of bearers to or from the backhaul bearer, where the signaling is for use at the base station for updating the Quality of Service (QoS) attributes of the backhaul bearer.

5. The method of claim 1, further comprising signaling from the self-backhauled base station to the base station to notify the base station regarding addition or removal of bearers to or from the backhaul bearer, where the signaling comprises multi-hop transmission of one or more signaling messages via the base station between the self-backhauled base station and a mobile management entity (MME) or between the self-backhauled base station and a third base station, where the signaling is used to convey information with respect to a backhaul bearer update.

6. The method of claim 5, wherein the signaling is for use at the base station for updating the Quality of Service (QoS) attributes of the backhaul bearer.

7. The method of claim 5, wherein the multi-hop transmission comprises multi-hop S1/X2 signaling including signaling messages exchanged at handover, bearer setup, bearer modification or bearer release.

8. The method of claim 1, wherein the base station and the self-backhauled base station comprise evolved NodeBs (eNodeBs) and wherein the network comprises a Long Term Evolution (LTE) network.

9. The method of claim 1, wherein the first wireless link comprises a radio frequency (RF) link, wherein the backhaul bearer comprises a radio bearer, and wherein the one or more second wireless links each comprise RF links.

10. The method of claim 1, wherein said identifying comprises identifying changes in at least one of the number and the characteristics of the UE bearers that are due to movement of the UEs within the network.

11. The method of claim 1, wherein said identifying comprises identifying changes in at least one of the number and the characteristics of the UE bearers that are due to either activation or deactivation of one or more of the UE bearers.

12. A method implemented by a base station for managing bearers over a first wireless link between a self-backhauled base station and the base station, wherein the self-backhauled base station serves one or more user equipments (UEs) via one or more second wireless links in a network, the method comprising:
identifying changes in at least one of the number and the characteristics of UE bearers multiplexed onto a backhaul bearer associated with the first wireless link;
dynamically reconfiguring resources allocated to the backhaul bearer based on the identified changes;
receiving signaling from the self-backhauled base station regarding addition or removal of UE bearers to or from the backhaul bearer;
performing admission control for the backhaul bearer and updating Quality of Service (QoS) attributes of the backhaul bearer in response to the signaling from the self-backhauled base station;
forwarding the signaling and the updated bearer information in a multi-hop fashion towards a mobility management entity (MME), wherein the signaling is used to convey information with respect to a backhaul bearer modification based on the QoS attributes.

13. The method of claim 12, wherein the signaling forwarded in a multi-hop fashion comprises multi-hop S1/X2 signaling including signaling messages exchanged at handover and bearer setup, modification and release.

14. The method of claim 12, wherein signaling associated with a UE of the one or more UEs is terminated at the base station and wherein the method further comprises:
executing admission control and updating Quality of Service (QoS) attributes of the backhauled bearer in response to the signaling; and
translating the signaling into outgoing signaling that reconfigures the backhaul bearer at the self-backhauled base station.

15. The method of claim 12, wherein the base station and the self-backhauled base station comprise evolved NodeBs (eNodeBs) and wherein the network comprises a Long Term Evolution (LTE) network.

16. The method of claim 12, wherein the first wireless link comprises a radio frequency (RF) link, wherein the backhaul bearer comprises a radio bearer, and wherein the one or more second wireless links each comprise RF links.

17. The method of claim 12, wherein said identifying comprises identifying changes in at least one of the number and the characteristics of the UE bearers that are due to movement of the UEs within the network.

18. The method of claim 12, where said identifying comprises identifying changes in at least one of the number and the characteristics of the bearers that are due to either activation or deactivation of one or more of the UE bearers.

19. A first base station connectable to a second base station via a first wireless link, wherein the first base station is capable of providing network service to one or more user equipments (UEs) via one or more second wireless links in a network and via the second base station and the first wireless link, the first base station comprising:
a processing unit configured to:
determine whether bearers multiplexed onto a backhaul bearer associated with the first wireless link are added to, or removed from, a backhaul bearer associated with the first wireless link; and
dynamically reconfigure resources allocated to the backhaul bearer based on the determination;
an interface configured to send a message requesting quality of service (QoS) modifications to a mobility management entity (MME) associated with the network;
wherein the processing unit is further configured to modify the backhaul bearer based on the requested QoS modifications.

20. The first base station of claim 19, wherein the first base station comprises an evolved NodeB (eNodeB).

21. The first base station of claim 19, wherein the first wireless link comprises a radio frequency (RF) link and wherein the backhaul bearer comprises a radio bearer.

22. The first base station of claim 19, wherein the bearers are added to, or removed from, the backhaul bearer based on movement of the one or more UEs.

23. The first base station of claim 19, further comprising a transceiver configured to signal the second base station to notify the second base station regarding addition or removal of bearers to or from the backhaul bearer.

24. A computer program product stored on a non-transitory computer-readable medium and comprising instructions that, when executed by at least one processing device, cause the at least one processing device to:
ascertain changes in at least one of the number and the characteristics of bearers multiplexed onto a backhaul bearer associated with a first radio frequency (RF) link between an evolved NodeB (eNodeB) and a self-backhauled eNodeB, wherein the self-backhauled eNodeB is capable of serving at least one user equipment (UE) via a second RF link in a network;
dynamically reconfigure resources allocated to the backhaul bearer based on the ascertained changes;
send a message requesting quality of service (QoS) modifications to a mobility management entity (MME) associated with the network; and modify the backhaul bearer, at the self-backhauled eNodeB, based on the requested QoS modifications.

25. The computer program product of claim 24, wherein the instructions further cause the at least one processing device to generate signaling for reconfiguring the resources allocated to the backhaul bearer at the eNodeB, the self-backhauled eNodeB, or both.

\* \* \* \* \*